(12) United States Patent
Watanabe et al.

(10) Patent No.: US 12,461,057 B2
(45) Date of Patent: Nov. 4, 2025

(54) GAS SENSOR ELEMENT

(71) Applicant: NGK Insulators, Ltd., Nagoya (JP)

(72) Inventors: Yusuke Watanabe, Nagoya (JP);
Shotaro Niizuma, Nagoya (JP);
Toshihiro Hirakawa, Nagoya (JP);
Kirari Takahashi, Nagoya (JP)

(73) Assignee: NGK INSULATORS, LTD., Nagoya (JP)

( * ) Notice: Subject to any disclaimer, the term of this patent is extended or adjusted under 35 U.S.C. 154(b) by 464 days.

(21) Appl. No.: 17/882,907

(22) Filed: Aug. 8, 2022

(65) Prior Publication Data

US 2023/0098074 A1 Mar. 30, 2023

(30) Foreign Application Priority Data

Sep. 30, 2021 (JP) ................................. 2021-161469

(51) Int. Cl.
*G01N 27/407* (2006.01)

(52) U.S. Cl.
CPC ..... *G01N 27/4071* (2013.01); *G01N 27/4074* (2013.01)

(58) Field of Classification Search
CPC ....................... G01N 27/4071; G01N 27/4074
See application file for complete search history.

(56) References Cited

U.S. PATENT DOCUMENTS

| 6,284,112 | B1 | 9/2001 | Kato et al. | |
| 2002/0005353 | A1* | 1/2002 | Kato | G01N 27/4075 204/426 |
| 2002/0060151 | A1* | 5/2002 | Kato | G01N 27/4072 204/425 |
| 2003/0136674 | A1 | 7/2003 | Kato et al. | |
| 2004/0231985 | A1 | 11/2004 | Kato et al. | |
| 2011/0083490 | A1* | 4/2011 | Murakami | G01N 27/419 73/31.05 |
| 2011/0226618 | A1* | 9/2011 | Fujita | G01N 27/4072 204/412 |

(Continued)

FOREIGN PATENT DOCUMENTS

| JP | 11-237362 A | 8/1999 |
| JP | 2000-028576 A | 1/2000 |

(Continued)

OTHER PUBLICATIONS

Watanabe et al., English translation of JP2011214852A, 2011 (Year: 2011).*

(Continued)

*Primary Examiner* — Luan V Van
*Assistant Examiner* — Shizhi Qian
(74) *Attorney, Agent, or Firm* — MATTINGLY & MALUR, PC

(57) ABSTRACT

Provided is a gas sensor element that can be used for relatively long period of time without leading to a problem even in a harsh usage environment. A gas sensor element according to one aspect of the present invention includes a laminate in which an internal space is provided, and a first porous layer arranged so as to face the internal space. The first porous layer is in contact with the first solid electrolyte layer and a side face of the spacer layer that faces the internal space, and has a porosity or 10% or more and 50% or less.

12 Claims, 6 Drawing Sheets

(56) References Cited

U.S. PATENT DOCUMENTS

| | | | |
|---|---|---|---|
| 2015/0219591 A1* | 8/2015 | Shimizu | G01N 27/4073 |
| | | | 204/426 |
| 2015/0253281 A1* | 9/2015 | Saito | G01N 27/4071 |
| | | | 204/416 |
| 2015/0276659 A1 | 10/2015 | Sekiya et al. | |
| 2018/0284058 A1* | 10/2018 | Watanabe | G01N 27/4067 |

FOREIGN PATENT DOCUMENTS

| | | | |
|---|---|---|---|
| JP | 2011214852 A | * | 10/2011 |
| JP | 2015-200643 A | | 11/2015 |

OTHER PUBLICATIONS

Schwartz, Lecture 2: Diffusion, https://scholar.harvard.edu/files/schwartz/files/2-diffusion_0.pdf, 2021 (Year: 2021).*
Designerdata, MF, https://designerdata.nl/materials/plastics/thermo-sets/melamine-formaldehyde, 2024 (Year: 2024).*
Qsrarematerials, YSZ ceramics, https://www.qsrarematerials.com/yttria-stabilized-zirconia-ysz-ceramics-p-38.html, 2024 (Year: 2024).*
Japanese Office Action received in corresponding Japanese Application No. 2021-161469 dated Oct. 1, 2024.
Unexamined U.S. Appl. No. 17/882,910, filed Aug. 8, 2022.

* cited by examiner

GAS SENSOR ELEMENT

CROSS-REFERENCE TO RELATED APPLICATION

The present application claims priority from Japanese application JP 2021-161469, filed on Sep. 30, 2021, the contents of which is hereby incorporated by reference into this application.

TECHNICAL FIELD

The present invention relates to a gas sensor element.

BACKGROUND ART

A conventionally-known gas sensor element has a laminated structure in which first and second solid electrolyte layers are stacked via a spacer layer that is made of a solid electrolyte and has a predetermined thickness, and a target gas flow portion for the introduction and flow of a measurement target gas is provided between the first and second solid electrolyte layers.

For example, JP H11-237362A discloses a gas sensor in which a buffer space is provided between a gas introduction opening and a processing space in a target gas flow portion. Also, J P 2015-200643A discloses a gas sensor in which a measurement electrode for detecting the concentration of a specified gas in a measurement target gas is independently provided in a chamber included in a target gas flow portion.

JP H11-237362A and JP 2015-200643A are examples of related art.

SUMMARY OF THE INVENTION

The inventors of the present invention found that conventional gas sensor elements having a laminated structure such as those described above have problems such as the following. Specifically, gas sensor elements are sometimes used in a harsh environment, such as in the case of being used as an exhaust gas sensor. It is desirable for the gas sensor element to continue to operate for a long period of time even in such a harsh usage environment, without leading to a problem such as degradation of the detection accuracy or the loss of detection capability.

However, during repeated use of the gas sensor element, a load may be generated inside the gas sensor element due to various factors. For example, stress can arise in a space inside the gas sensor element (i.e., the target gas flow portion) due to changes in temperature, atmospheric pressure, and the like. The repeated generation of such stress can possibly cause breakdown of the space inside the gas sensor element. In a harsh usage environment in particular, such stress is likely to occur, and breakdown of the internal space is likely to occur.

Also, in the internal space, corner portions are formed at the boundaries between the spacer and the solid electrolyte layers. Stress is likely to become concentrated at the corner portions, and as a result, cracks can easily form in and around the corner portions. The inventors of the present invention found that breakdown of the internal space occurs due to the above-mentioned reasons, and such breakdown may lead to detection problems.

The present invention has been made in view of such circumstances, and an object of one aspect of the present invention is to provide a gas sensor element that can be used for a relatively long period of time without leading to a problem even in a harsh usage environment.

In order to solve the above-mentioned problems, configurations such as the following are employed in the present invention.

A gas sensor element according to an aspect of the present invention includes a laminate provided with an internal space into which a measurement target gas is to be introduced, and one or more porous layers arranged so as to face the internal space. The laminate is constituted by a first solid electrolyte layer, a second solid electrolyte layer, and a spacer layer. In the laminate, the spacer layer is arranged between the first solid electrolyte layer and the second solid electrolyte layer such that the internal space is provided between the first solid electrolyte layer and the second solid electrolyte layer. The one or more porous layers include at least either a first porous layer or a second porous layer, and each of the one or more porous layers has a porosity of 10% or more and 50% or less. The first porous layer is in contact with both the first solid electrolyte layer and at least one side face of the spacer layer that faces the internal space. In other words, the first porous layer is arranged so as to face the internal space and be in contact with both the first solid electrolyte layer and at least one side face of the spacer layer that faces the internal space. The second porous layer is in contact with both the second solid electrolyte layer and at least one side face of the spacer layer that faces the internal space. In other words, the second porous layer is arranged so as to face the internal space and be in contact with both the second solid electrolyte layer and at least one side face of the spacer layer that faces the internal space.

In this configuration, the first porous layer is arranged so as to face the internal space at a position corresponding to a corner portion of an internal space in a conventional gas sensor element, particularly a corner portion formed at a boundary between the spacer layer and the first solid electrolyte layer (contact point between the spacer layer and the first solid electrolyte layer). Similarly, the second porous layer is arranged so as to face the internal space at a position corresponding to a corner portion of an internal space in a conventional gas sensor element, particularly a corner portion formed at a boundary between the spacer layer and the second solid electrolyte layer (contact point between the spacer layer and the second solid electrolyte layer). In other words, at least either the first porous layer or the second porous layer is arranged so as to face the internal space at a position corresponding to a corner portion of an internal space in a conventional gas sensor element. Due to at least either the first porous layer or the second porous layer being arranged as described above, that is to say due to the one or more porous layers, it is possible to reduce stress that becomes concentrated at a location corresponding to a corner portion of the internal space in a conventional gas sensor element.

Also, the inventors of the present invention found through experimentation (a temperature rise test) that if the porosity of the one or more porous layers is set to 50% or less, the one or more porous layers can suppress the formation of cracks. Also, due to the characteristic of being "porous", each of the one or more porous layers has a porosity of 10% or more. For this reason, the porosity of each of the one or more porous layers is 10% or more and 50% or less.

Accordingly, with the gas sensor element according to the above aspect of the present invention, it is possible to prevent a situation in which a crack forms in or near a corner portion and the internal space suffers breakdown, and the gas sensor element can be used for a relatively long period of time without leading to a problem even in a harsh usage environment.

In one example, the first porous layer may be arranged so as to face the internal space and be in contact with the lower end of a side face of the spacer layer that faces the internal space and the upper face of the first solid electrolyte layer. In other words, the first porous layer that faces the internal space may be arranged so as to be in contact with, and sandwiched between, the spacer layer and the first solid electrolyte layer. In this configuration, due to the first porous layer that is arranged between the spacer layer and the first solid electrolyte layer, it is possible to lower the Young's modulus of the gas sensor element (particularly the laminate) and reduce stress that becomes concentrated in or near a corner portion of the internal space. In other words, due to arranging the first porous layer as a cushioning material between the spacer layer and the first solid electrolyte layer, it is possible to prevent a situation in which stress becomes concentrated and a crack forms in or near a corner portion of the internal space.

In one example, the second porous layer may be arranged so as to face the internal space and be in contact with the upper end of a side face of the spacer layer that faces the internal space and the lower face of the second solid electrolyte layer. In other words, the second porous layer that faces the internal space may be arranged so as to be in contact with, and sandwiched between, the spacer layer and the second solid electrolyte layer. In this configuration, due to the second porous layer that is arranged between the spacer layer and the second solid electrolyte layer, it is possible to lower the Young's modulus of the gas sensor element (particularly the laminate) and reduce stress that becomes concentrated in or near a corner portion of the internal space. In other words, due to arranging the second porous layer as a cushioning material between the spacer layer and the second solid electrolyte layer, it is possible to prevent a situation in which stress becomes concentrated and a crack forms in or near a corner portion of the internal space.

In the gas sensor element according to one of the above aspects, each of the one or more porous layers may have a thickness of 40 µm or less. Here, if the thickness of each of the one or more porous layers, which are arranged so as to face the internal space, is too large, the amount of oxygen taken into the one or more porous layers increases, and a longer time (light-off time) is required for oxygen to be pumped from or into the internal space. Therefore, in consideration of the light-off time, it is desirable to keep the thickness of each of the one or more porous layers to a predetermined value or lower, and the inventors of the present invention found that it is desirable to keep this thickness to 40 µm or less. By setting the thickness of each of the one or more porous layers to 40 µm or less, the light-off time can be set to a time within a range that can withstand actual use (normal use) of the gas sensor element.

In the gas sensor element according to one of the above aspects, each of the one or more porous layers may have a thickness of 10 µm or more. If the thicknesses of the first porous layer and the second porous layer are each too small, it is not possible to expect the effects of preventing the concentration of stress with use of at least either the first porous layer or the second porous layer, and suppressing breakdown of (the formation of cracks in) the internal space. Therefore, it is desirable that the first porous layer and the second porous layer (the one or more porous layers) each have a predetermined thickness, and the inventors of the present invention found that it is desirable that this thickness is 10 µm or more. According to this configuration, compared to the case where the thickness of each of the one or more porous layers is less than 10 µm, it is possible to sufficiently achieve the effects of preventing the concentration of stress, for example, and suppressing breakdown of (the formation of cracks in) the internal space.

In the gas sensor element according to one of the above aspects, the internal space may include one or more chambers into or from which oxygen is pumped, and one or more porous layers among the one or more porous layers may have a portion that extends into at least one chamber among the one or more chambers. In this case, it is desirable that the sum of the volumes of the portions of the one or more porous layers that extend into the at least one chamber is 5% (percent) or more and 30% or less of the volume of the at least one chamber.

In the one or more porous layers, if the sum of the volumes of the portions that extend into the chamber is larger than 30% of the volume of the chamber, the time required for oxygen to be pumped from or into the chamber (light-off time) increases. In consideration of the light-off time, it is desirable that the sum of the volumes of the portions of the one or more porous layers that extend into the chamber is 30% or less of the volume of the chamber. Also, the inventors of the present invention found through experimentation (a temperature rise test) that if the sum of the volumes of the portions of the one or more porous layers that extend into the chamber is set to 5% or more of the volume of the chamber, it is possible to effectively suppress the formation of cracks. Therefore, if the sum of the volumes of the portions of the one or more porous layers that extend into the chamber is set to 5% or more and 30% or less of the volume of the chamber, it is possible to effectively suppress the breakdown of (the formation of cracks in) the internal space.

In the gas sensor element according to one of the above aspects, at least one porous layer among the one or more porous layers may include an unexposed portion. The unexposed portion is a portion that is located between the spacer layer and at least one solid electrolyte layer out of the first solid electrolyte layer and the second solid electrolyte layer. Also, the unexposed portion is in contact with both the spacer layer and at least either the first solid electrolyte layer or the second solid electrolyte layer, and does not face the internal space. For example, the unexposed portion is a portion arranged so as to be in contact with, and sandwiched between, the spacer layer and the first solid electrolyte layer, and does not face the internal space. As another example, the unexposed portion is a portion arranged so as to be in contact with, and sandwiched between, the spacer layer and the second solid electrolyte layer, and does not face the internal space. In the case where the porous layer includes the unexposed portion, it is desirable that the volume of the unexposed portion is 10% or more of the volume of the porous layer that includes the unexposed portion.

According to this configuration, the unexposed portion is arranged so as to be in contact with, and sandwiched between, the spacer layer and the first solid electrolyte layer, for example, and thus the unexposed portion can be used as a cushioning material between the spacer layer and the first solid electrolyte layer. However, if the volume of the unexposed portion is too small, the unexposed portion cannot sufficiently achieve the effect of a cushioning material between the spacer layer and the first solid electrolyte layer. Therefore, it is desirable that the unexposed portion has a predetermined volume. Therefore, the inventors of the present invention repeatedly examined the volume of the unexposed portion, and found that the volume of the unexposed portion is desirably 10% or more of the volume of the porous layer that includes the unexposed portion. Similarly, it was also found that the volume of an unexposed portion arranged so as to be in contact with, and sandwiched between, the spacer layer and the second solid electrolyte layer is desirably 10% or more of the volume of the porous layer that includes the unexposed portion. Accordingly, by setting the volume of the unexposed portion to 10% or more of the volume of the porous layer that includes the unexposed portion, it is possible to prevent a situation in which stress becomes concentrated and a crack forms in or near a corner portion of the internal space.

In the gas sensor element according to one of the above aspects, at least one porous layer among the one or more porous layers may overlap at least a portion of at least one electrode disposed inside the internal space. Specifically, the porous layer may overlap at least a portion of an opposing face of the electrode, which is on the side opposite to the face of the electrode that is in contact with at least either the first solid electrolyte layer or the second solid electrolyte layer.

The inventors of the present invention noticed that problems such as the following may occur with respect to an electrode disposed inside the internal space. Specifically, if platinum (Pt) is used for the electrode, for example, platinum oxide may be produced when the gas sensor element is repeatedly used for a long time. Since platinum oxide is more likely to vaporize than platinum at high temperatures, the vaporization of platinum oxide may cause peeling to occur at the interface between the electrode and the solid electrolyte layer (first solid electrolyte layer or second solid electrolyte layer) that is in contact with the electrode. The inventors of the present invention noticed that there is a problem that the electrode disposed inside the internal space becomes peeled away from the solid electrolyte layer due to the above-mentioned causes, which may lead to a problem in detection by the gas sensor element. In particular, if the gas sensor element is used as an exhaust gas sensor, the electrode disposed inside the internal space is often exposed to high temperatures, and therefore, peeling from the solid electrolyte layer is likely to occur.

In view of this, the inventors of the present invention considered preventing the peeling of the electrode by arranging the porous layer so as to overlap at least a portion of an opposing face of the electrode disposed inside the internal space, the opposing face being on the side opposite to the face in contact with the solid electrolyte layer. Specifically, the inventors thought that, by using the porous layer to press the electrode against the solid electrolyte layer that is in contact with the electrode, it may be possible to prevent the electrode from becoming peeled away from the solid electrolyte layer. The inventors of the present invention found through experimentation (an electrode peeling test) that peeling of the electrode can be suppressed by arranging the porous layer so as to overlap at least a portion of an opposing face of the electrode, which is on the side opposite to the face that is in contact with the solid electrolyte layer.

Therefore, according to the above configuration, it is possible to provide a gas sensor element in which the electrode can be prevented from peeling from the solid electrolyte layer that is in contact with the electrode, and that can be used for a relatively long period of time without leading to a problem even in a harsh usage environment.

In the gas sensor element according to one of the above aspects, the area of the portion of the at least one electrode overlapped by the at least one porous layer may be 0.5% or more and 20% or less of the area of the opposing face of the at least one electrode.

Here, if the area of the portion overlapped by the porous layer is greater than 20% of the total area of the opposing face of the electrode, the performance of the electrode (e.g., detection accuracy) may degrade. In view of this, the area of the portion of the electrode overlapped by the porous layer is 20% or less of the area of the opposing face of the electrode.

Also, the inventors of the present invention found through experimentation (an electrode peeling test) that if the area of the portion of the electrode overlapped by the porous layer is 0.5% or more of the area of the opposing face of the electrode, it is possible to effectively suppress peeling of the electrode.

In other words, if the area of the portion of the electrode overlapped by the porous layer is 0.5% or more and 20% or less of the area of the opposing face of the electrode, it is possible to effectively suppress peeling of the electrode while also preventing degradation of the performance of the electrode. Accordingly, with this configuration, it is possible to effectively suppress the peeling of the electrode while also preventing degradation of the performance of the electrode, and it is possible to provide a gas sensor element that can be used for a relatively long period of time without leading to a problem even in a harsh usage environment.

In the gas sensor element according to one of the above aspects, the content percentage of zirconia ($ZrO_2$) in each of the one or more porous layers may be 50 wt % or more. Here, as described above, the first porous layer is in contact with the first solid electrolyte layer, and the second porous layer is in contact with the second solid electrolyte layer. The first solid electrolyte layer and the second solid electrolyte layer are each constituted by an oxygen-ion-conductive solid electrolyte layer made of zirconia or the like. For this reason, if each of the one or more porous layers is made of a material similar to that of the first solid electrolyte layer and the second solid electrolyte layer, adhesion between the first porous layer and the first solid electrolyte layer can be improved, and adhesion between the second porous layer and the second solid electrolyte layer can be improved. Accordingly, by setting the content percentage of zirconia ($ZrO_2$) in each of the one or more porous layers to 50 wt % or more, it is possible to improve adhesion between the first porous layer and the first solid electrolyte layer, and improve adhesion between the second porous layer and the second solid electrolyte layer.

In the gas sensor element according to one of the above aspects, each of the one or more porous layers may be an insulating layer.

According to the present invention, it is possible to provide a gas sensor element that can be used for a relatively long period of time without leading to a problem even in a harsh usage environment.

EMBODIMENT OF THE INVENTION

Hereinafter, an embodiment according to one aspect of the present invention (hereinafter also referred to as "the present embodiment") will be described with reference to the drawings. Note that the present embodiment described below is merely illustrative of the present invention in all respects. It goes without saying that various improvements and modifications can be made without departing from the scope of the present invention. In other words, in the practice of the present invention, specific configurations suitable for embodiments may be employed as appropriate.

Configuration Examples

Figure 1:
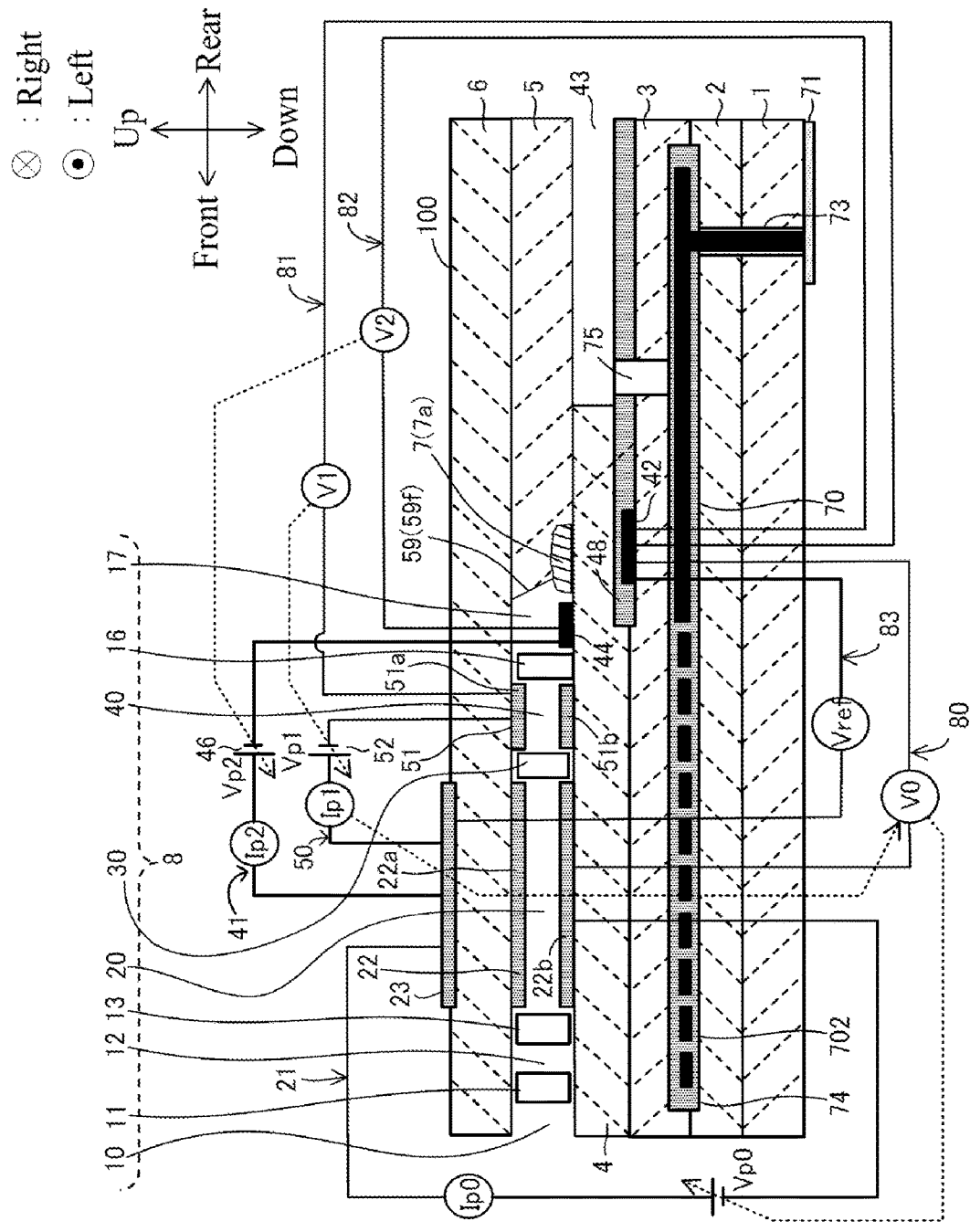
FIG. 1 is a schematic cross-sectional view schematically showing an example of the configuration of a sensor element according to an embodiment.

FIG. 1 is a schematic cross-sectional view schematically showing an example of the configuration of a gas sensor element 100 according to the present embodiment. The gas sensor element 100 is shaped as an elongated plate-like body that extends along the lengthwise direction (axial direction), for example, and has a rectangular parallelepiped shape, for example. The gas sensor element 100 illustrated in FIG. 1 includes a leading end portion and a rear end portion as end portions in the lengthwise direction, and in the following description, the leading end portion is the left end portion (i.e., the front-side end portion) in FIG. 1 and the rear end portion is the right end portion (i.e., the rear-side end portion) in FIG. 1. However, the shape of the gas sensor element 100 is not limited to this example, and may be appropriately selected in accordance with the mode of implementation. Note that in the following description, the far side relative to the paper surface in FIG. 1 is the right side of the gas sensor element 100, and the near side relative to the paper surface is the left side of the gas sensor element 100.

The gas sensor element 100 has a structure in which six layers, namely, a first substrate layer 1, a second substrate layer 2, a third substrate layer 3, a first solid electrolyte layer 4, a spacer layer 5, and a second solid electrolyte layer 6 are stacked in this order from the lower side in the cross-section of FIG. 1, and these layers are each constituted by an oxygen-ion-conductive solid electrolyte layer made of zirconia ($ZrO_2$) or the like. In other words, the gas sensor element 100 includes a laminate constituted by the first solid electrolyte layer 4, the second solid electrolyte layer 6, and the spacer layer 5. The solid electrolytes forming the six layers (i.e., the first substrate layer 1, the second substrate layer 2, the third substrate layer 3, the first solid electrolyte layer 4, the spacer layer 5, and the second solid electrolyte layer 6) may be dense. Here, being "dense" means having a porosity of 5% or less.

The gas sensor element 100 is manufactured by performing steps such as predetermined processing and printing of wiring patterns on ceramic green sheets corresponding to the respective layers, for example, stacking the resultant layers, and then integrating them through firing. In one example, the gas sensor element 100 is a laminate constituted by a plurality of ceramic layers. In the present embodiment, the upper face of the second solid electrolyte layer 6 forms the upper face of the gas sensor element 100, the lower face of the first substrate layer 1 forms the lower face of the gas sensor element 100, and side faces of the layers 1 to 6 form side faces of the gas sensor element 100.

In the leading end portion of the gas sensor element 100, a gas introduction opening 10, a first diffusion control portion 11, a buffer space 12, a second diffusion control portion 13, a first internal cavity 20, a third diffusion control portion 30, a second internal cavity 40, a fourth diffusion control portion 16, and a third internal cavity 17 are arranged adjacent to each other in this order in a connected manner between the lower face of the second solid electrolyte layer 6 and the upper face of the first solid electrolyte layer 4.

The gas introduction opening 10, the buffer space 12, the first internal cavity 20, the second internal cavity 40, and the third internal cavity 17 are spaces provided by removing portions of the spacer layer 5, and more specifically are spaces inside the gas sensor element 100 (internal spaces) defined on the upper side by the lower face of the second solid electrolyte layer 6 and defined on the lower side by the upper face of the first solid electrolyte layer 4.

The first diffusion control portion 11 is provided as two laterally elongated slits (the long sides of the openings thereof extending along a direction perpendicular to the plane of the drawing). Also, the second diffusion control portion 13, the third diffusion control portion 30, and the fourth diffusion control portion 16 are provided as holes whose lengths along a direction perpendicular to the plane of the drawing are shorter than the first internal cavity 20, the second internal cavity 40, and the third internal cavity 17, respectively.

As illustrated in FIG. 1, the second diffusion control portion 13 and the third diffusion control portion 30 may each be provided as two laterally elongated slits (the long sides of the openings thereof extending along a direction perpendicular to the plane of the drawing), similarly to the first diffusion control portion 11. On the other hand, the fourth diffusion control portion 16 may be provided as one laterally elongated slit (the lengthwise direction of the opening thereof extending along a direction perpendicular to the plane of the drawing) formed as a gap defined on one side by the lower face of the second solid electrolyte layer 6. In other words, the fourth diffusion control portion 16 may be in contact with the upper face of the first solid electrolyte layer 4. The second diffusion control portion 13, the third diffusion control portion 30, and the fourth diffusion control portion 16 will each be described in detail later. A portion (internal space) extending from the gas introduction opening 10 to the third internal cavity 17 will be referred to as a target gas flow portion 8.

In the gas sensor element 100 illustrated in FIG. 1, the rear side of the target gas flow portion 8 (specifically, the third internal space 17) is blocked by a front side face 59f of the spacer layer 5 and a side face of a first porous layer 7a, which is in contact with the lower end of the front side face 59f, that faces the third internal cavity 17. Although described in detail later, at least one side (at least one side among the front side, the rear side, the right side, and the left side) of the target gas flow portion 8 is blocked by the spacer layer 5 and a porous layer 7. Specifically, at least one side of the target gas flow portion 8 is blocked by a side face 59 of the spacer layer 5 and a face of the porous layer 7, which is in contact with an end portion (lower end, upper end) of the side face 59, that faces the target gas flow portion 8.

The first porous layer 7a (porous layer 7) is a layer that is porous, and the term "porous" means having a porosity of 10% or more. The porous layer 7 is constituted by a material containing a large amount of zirconia ($ZrO_2$), for example, and the content percentage of zirconia may be 50 wt % or more. Also, the porous layer 7 may be configured as an insulating layer. The thickness of the porous layer 7 is 10 μm or more and 40 μm or less, for example.

The porous layer 7 is arranged so as to face the target gas flow portion 8, and in the example shown in FIG. 1, the first porous layer 7a is arranged so as to face the target gas flow portion 8, particularly the third internal cavity 17. Also, the porous layer 7 is in contact with at least one side face 59 of the spacer layer 5, and in particular, is in contact with an end portion (lower end, upper end) of at least one side face 59 of the spacer layer 5. In the example shown in FIG. 1, the first porous layer 7a is in contact with the front side face 59f of the spacer layer 5, and in particular, is in contact with the lower end of the front side face 59f of the spacer layer 5. Also, the porous layer 7 is in contact with at least either the first solid electrolyte layer 4 or the second solid electrolyte layer 6, and in particular, faces at least either the upper face of the first solid electrolyte layer 4 or the lower face of the second solid electrolyte layer 6. In the example shown in FIG. 1, the first porous layer 7a is in contact with the first solid electrolyte layer 4, and in particular, faces the upper face of the first solid electrolyte layer 4. In this way, at least one of the sides of the target gas flow portion 8 is blocked by the side face 59 of the spacer layer 5 and the face of the porous layer 7 that faces the target gas flow portion 8. In the example shown in FIG. 1, the rear side of the target gas flow portion 8 (i.e., the rear side of the third internal cavity 17) is blocked by the front side face 59f of the spacer layer 5 and a face of the first porous layer 7a, which is in contact with the front side face 59f of the spacer layer 5, that faces the target gas flow portion 8.

A reference gas introduction space 43 having side portions defined by side faces of the first solid electrolyte layer 4 is provided between the upper face of the third substrate layer 3 and the lower face of the spacer layer 5, at a position that is farther from the leading end side (front side of the gas sensor element 100) than the target gas flow portion 8 is. A reference gas such as air is introduced into the reference gas introduction space 43. Note that the configuration of the gas sensor element 100 need not be limited to this example. In another example, the first solid electrolyte layer 4 may be configured to extend to the rear end of the gas sensor element 100, and the reference gas introduction space 43 may be omitted. In this case, an air introduction layer 48 may be configured to extend to the rear end of the gas sensor element 100.

The air introduction layer 48 is a layer made of porous alumina and is configured such that reference gas is introduced thereto via the reference gas introduction space 43. In addition, the air introduction layer 48 is formed so as to cover a reference electrode 42.

The reference electrode 42 is formed so as to be held between the first solid electrolyte layer 4 and the upper face of the third substrate layer 3, and is surrounded by the air introduction layer 48 that is connected to the reference gas introduction space 43. The reference electrode 42 is used to measure the oxygen concentration (oxygen partial pressure) in the first internal cavity 20, the second internal cavity 40, and the third internal cavity 17. This will be described in detail below.

The gas introduction opening 10 is a portion of the target gas flow portion 8 that is open to the external space. A target gas in the external space is taken into the gas sensor element 100 through the gas introduction opening 10. In the present embodiment, as illustrated in FIG. 1, the gas introduction opening 10 is arranged in the front side face of the gas sensor element 100. In other words, the target gas flow portion 8 is configured to have an opening in the front side face of the gas sensor element 100. However, it is not essential that the target gas flow portion 8 is configured to have an opening in the front side face of the gas sensor element 100, or in other words, that the gas introduction opening 10 is arranged in the front side face of the gas sensor element 100. The gas sensor element 100 need only be able to introduce a target gas from the external space into the target gas flow portion 8, and the gas introduction opening 10 may be arranged in the right side face or the left side face of the gas sensor element 100, for example.

When the gas introduction opening 10 is arranged in the front side face of the gas sensor element 100, the target gas flow portion 8 may be blocked by a dense ceramic layer at the side faces (right side face and left side face) of the gas sensor element 100. The ceramic layer may be made of a material such as zirconia ($ZrO_2$). If the target gas flow portion 8 is blocked by a dense ceramic layer at the side faces of the gas sensor element 100, the gas sensor element 100 is configured such that a target gas in the external space is introduced into the gas sensor element 100 through the gas introduction opening 10.

However, in the gas sensor element 100, it is not essential that the target gas flow portion 8 is blocked by a dense ceramic layer at the side faces of the gas sensor element 100. Also, it is not essential that the gas sensor element 100 includes the gas introduction opening 10. In other words, in the gas sensor element 100, it is sufficient that a target gas in the external space can be introduced into the target gas flow portion 8, and it is not essential that the target gas in the external space is introduced through the gas introduction opening 10. For example, the gas sensor element 100 may have a configuration in which at least one of the side faces 59 of the spacer layer 5 is open instead of being blocked by a dense ceramic layer, such that the target gas in the external space can be introduced into the target gas flow portion 8 without provision of the gas introduction opening 10.

The first diffusion control portion 11 is a region that applies predetermined diffusion resistance to the measurement target gas introduced from the gas introduction opening 10.

The buffer space 12 is a space that is provided in order to guide the measurement target gas, which was introduced from the first diffusion control portion 11, to the second diffusion control portion 13.

The second diffusion control portion 13 is a region that applies predetermined diffusion resistance to the measurement target gas that is to be introduced from the buffer space 12 into the first internal cavity 20.

When the measurement target gas outside of the gas sensor element 100 is introduced into the first internal cavity 20, the measurement target gas, which has been rapidly introduced through the gas introduction opening 10 into the gas sensor element 100 due to a change in the pressure of the measurement target gas in the external space (a pulsation of the exhaust pressure in the case in which the measurement target gas is exhaust gas of an automobile), is not directly introduced into the first internal cavity 20, but rather is introduced into the first internal cavity 20 after passing through the first diffusion control portion 11, the buffer space 12, and the second diffusion control portion 13 where fluctuation in the concentration of the measurement target gas is canceled. Accordingly, fluctuation in the concentration of the measurement target gas introduced into the first internal space is reduced to be almost negligible.

The first internal cavity 20 is provided as a space for adjusting the oxygen partial pressure in the measurement target gas introduced via the second diffusion control portion 13. The oxygen partial pressure is adjusted by operation of a main pump cell 21.

The main pump cell 21 is an electro-chemical pump cell constituted by an internal pump electrode 22 having a ceiling electrode portion 22a provided over substantially the entire lower face of the second solid electrolyte layer 6 facing the first internal cavity 20, an external pump electrode 23 provided so as to be exposed to the external space in the region corresponding to the ceiling electrode portion 22a on the upper face of the second solid electrolyte layer 6 (i.e., the upper face of the gas sensor element 100), and the second solid electrolyte layer 6 held between these electrodes.

The internal pump electrode 22 is formed so as to extend across the upper and lower solid electrolyte layers that define the first internal cavity 20 (i.e., the second solid electrolyte layer 6 and the first solid electrolyte layer 4), and the spacer layer 5 that forms side walls. Specifically, the ceiling electrode portion 22a is formed on the lower face of the second solid electrolyte layer 6 that forms the ceiling face of the first internal cavity 20, and a bottom electrode portion 22b is formed on the upper face of the first solid electrolyte layer 4 that forms the bottom face. Side electrode portions (not shown) that connect the ceiling electrode portion 22a and the bottom electrode portion 22b are formed on side wall faces (inner faces) of the spacer layer 5 that forms the two side wall portions of the first internal cavity 20. In other words, the internal pump electrode 22 is provided in the form of a tunnel at the region in which the side electrode portions are arranged.

The internal pump electrode 22 and the external pump electrode 23 are formed as porous cermet electrodes (for example, cermet electrodes formed using $ZrO_2$ and Pt containing 1% Au). Note that the internal pump electrode 22, which comes into contact with the measurement target gas, is made of a material that has a lowered capability of reducing a nitrogen oxide ($NO_x$) component in the measurement target gas.

The gas sensor element 100 is configured such that the main pump cell 21 can apply a desired pump voltage Vp0 between the internal pump electrode 22 and the external pump electrode 23, thereby causing a pump current Ip0 to flow in the positive direction or the negative direction between the internal pump electrode 22 and the external pump electrode 23, so that oxygen in the first internal cavity 20 is pumped out to the external space, or oxygen in the external space is pumped into the first internal cavity 20. When oxygen in the first internal cavity 20 is pumped out to the external space, the pumped oxygen is discharged from the external pump electrode 23.

Furthermore, in order to detect the oxygen concentration (oxygen partial pressure) in the atmosphere in the first internal cavity 20, the internal pump electrode 22, the second solid electrolyte layer 6, the spacer layer 5, the first solid electrolyte layer 4, the third substrate layer 3, and the reference electrode 42 constitute an oxygen partial pressure detection sensor cell 80 for main pump control (i.e., an electro-chemical sensor cell).

The gas sensor element 100 is configured to be capable of identifying the oxygen concentration (oxygen partial pressure) in the first internal cavity 20 by measuring an electromotive force V0 in the oxygen partial pressure detection sensor cell 80 for main pump control. Furthermore, the pump current Ip0 is controlled by performing feedback control on Vp0 such that the electromotive force V0 is kept constant. Accordingly, the oxygen concentration in the first internal cavity 20 can be kept at a predetermined constant value.

The third diffusion control portion 30 is a region that applies predetermined diffusion resistance to the measurement target gas whose oxygen concentration (oxygen partial pressure) has been controlled through operation of the main pump cell 21 in the first internal cavity 20, thereby guiding the measurement target gas to the second internal cavity 40.

In the second internal cavity 40, the gas sensor element 100 is configured such that the measurement target gas, which was subjected to adjustment of the oxygen concentration (oxygen partial pressure) in advance in the first internal cavity 20 and then introduced via the third diffusion control portion, is further subjected to adjustment of the oxygen partial pressure by an auxiliary pump cell 50. Accordingly, the oxygen concentration in the second internal cavity 40 can be precisely kept at a constant value, and the gas sensor element 100 with this configuration thus can measure the $NO_x$ concentration with high accuracy.

The auxiliary pump cell 50 is an auxiliary electro-chemical pump cell constituted by an auxiliary pump electrode 51, the external pump electrode 23 (which is not limited to the external pump electrode 23, and may be any appropriate electrode outside the gas sensor element 100), and the second solid electrolyte layer 6. The auxiliary pump electrode 51 has a ceiling electrode portion 51a provided on substantially the entirety of the lower face of the second solid electrolyte layer 6 facing the second internal cavity 40.

The auxiliary pump electrode 51 with this configuration is arranged inside the second internal cavity 40 in the form of a tunnel similarly to the above-described internal pump electrode 22 provided inside the first internal cavity 20. That is to say, the ceiling electrode portion 51a is formed on the second solid electrolyte layer 6 that forms the ceiling face of the second internal cavity 40, and a bottom electrode portion 51b is formed on the first solid electrolyte layer 4 that forms the bottom face of the second internal cavity 40. Side electrode portions (not shown) that connect the ceiling electrode portion 51a and the bottom electrode portion 51b are formed on two wall faces of the spacer layer 5 that form side walls of the second internal cavity 40. Thus, the auxiliary pump electrode 51 is in the form of a tunnel.

Note that the auxiliary pump electrode 51 is also made of a material that has a lowered capability of reducing a nitrogen oxide component in the measurement target gas, similarly to the internal pump electrode 22.

The gas sensor element 100 is configured such that the auxiliary pump cell 50 can apply a desired voltage Vp1 between the auxiliary pump electrode 51 and the external pump electrode 23, so that oxygen in the atmosphere in the second internal cavity 40 is pumped out to the external space, or oxygen is pumped from the external space into the second internal cavity 40.

Furthermore, in order to control the oxygen partial pressure in the atmosphere in the second internal cavity 40, the auxiliary pump electrode 51, the reference electrode 42, the second solid electrolyte layer 6, the spacer layer 5, the first solid electrolyte layer 4, and the third substrate layer 3 constitute an oxygen partial pressure detection sensor cell 81 for auxiliary pump control (i.e., an electro-chemical sensor cell).

Note that the auxiliary pump cell 50 performs pumping using a variable power source 52 whose voltage is controlled based on an electromotive force V1 detected by the oxygen partial pressure detection sensor cell 81 for auxiliary pump control. Accordingly, the oxygen partial pressure in the atmosphere in the second internal cavity 40 is controlled to be a partial pressure that is low enough to substantially not affect the $NO_x$ measurement.

Furthermore, a pump current Ip1 is used to control the electromotive force of the oxygen partial pressure detection sensor cell 80 for main pump control. Specifically, the pump current Ip1 is input as a control signal to the oxygen partial pressure detection sensor cell 80 for main pump control, and the electromotive force V0 is controlled so as to keep a constant gradient of the oxygen partial pressure in the measurement target gas that is introduced from the third diffusion control portion 30 into the second internal cavity 40. In the case where the sensor is used as a $NO_x$ sensor, the oxygen concentration in the second internal cavity 40 is kept at a constant value of around 0.001 ppm through operation of the main pump cell 21 and the auxiliary pump cell 50.

The fourth diffusion control portion 16 is a region that applies predetermined diffusion resistance to the measurement target gas whose oxygen concentration (oxygen partial pressure) has been controlled through operation of the auxiliary pump cell 50 in the second internal cavity 40, thereby guiding the measurement target gas to the third internal cavity 17. The fourth diffusion control portion 16 serves to limit the amount of $NO_x$ flowing into the third internal cavity 17.

The third internal cavity 17 is provided as a space for performing processing regarding measurement of the concentration of nitrogen oxide ($NO_x$) in the measurement target gas that was introduced via the fourth diffusion control portion 16 after being subjected to adjustment of the oxygen concentration (oxygen partial pressure) in the second internal cavity 40. The measurement of the $NO_x$ concentration is mainly performed by operation of a measurement pump cell 41 in the third internal cavity 17.

In the third internal cavity 17 illustrated in FIG. 1, the rear side of the third internal cavity 17 is blocked by the front side face 59f of the spacer layer 5 and a face of the first porous layer 7a, which is in contact with the front side face 59f of the spacer layer 5, that faces the target gas flow portion 8 (third internal cavity 17).

The measurement pump cell 41 measures the concentration of $NO_x$ in the measurement target gas, in the third internal cavity 17. The measurement pump cell 41 is an electro-chemical pump cell constituted by a measurement electrode 44, the external pump electrode 23, the second solid electrolyte layer 6, the spacer layer 5, and the first solid electrolyte layer 4. The measurement electrode 44 is provided at a position spaced apart from the third diffusion control portion 30, on the upper face of the first solid electrolyte layer 4 facing the third internal cavity 17.

The measurement electrode 44 is a porous cermet electrode. The measurement electrode 44 is made of a material that has a higher capability of reducing a $NO_x$ component in the measurement target gas than the internal pump electrode 22. The measurement electrode 44 functions also as a $NO_x$ reduction catalyst for reducing $NO_x$ that is present in the atmosphere in the third internal cavity 17.

The gas sensor element 100 is configured such that the measurement pump cell 41 can pump out oxygen generated through decomposition of nitrogen oxide in the atmosphere around the measurement electrode 44, and can detect the amount of generated oxygen as a pump current Ip2.

Furthermore, in order to detect the oxygen partial pressure around the measurement electrode 44, the second solid electrolyte layer 6, the spacer layer 5, the first solid electrolyte layer 4, the third substrate layer 3, the measurement electrode 44, and the reference electrode 42 constitute an oxygen partial pressure detection sensor cell 82 for measurement pump control (i.e., an electro-chemical sensor cell). A variable power source 46 is controlled based on a voltage (an electromotive force) V2 detected by the oxygen partial pressure detection sensor cell 82 for measurement pump control.

The measurement target gas guided into the second internal cavity 40 passes through the fourth diffusion control portion 16 and reaches the measurement electrode 44 in the third internal cavity 17 in a state in which the oxygen partial pressure has been controlled. Nitrogen oxide in the measurement target gas around the measurement electrode 44 is reduced to generate oxygen ($2NO \rightarrow N_2 + O_2$). The generated oxygen is pumped by the measurement pump cell 41, and, at that time, a voltage Vp2 of the variable power source is controlled such that the control voltage V2 detected by the oxygen partial pressure detection sensor cell 82 for measurement pump control is kept constant. The amount of oxygen generated around the measurement electrode 44 is proportional to the concentration of nitrogen oxide in the measurement target gas, and thus, it is possible to calculate the concentration of nitrogen oxide in the measurement target gas using the pump current Ip2 in the measurement pump cell 41.

Furthermore, if the measurement electrode 44, the first solid electrolyte layer 4, the third substrate layer 3, and the reference electrode 42 are combined to constitute an oxygen partial pressure detection means as an electro-chemical sensor cell, it becomes possible to detect an electromotive force that corresponds to a difference between the amount of oxygen generated through reduction of a $NO_x$ component in the atmosphere around the measurement electrode 44 and the amount of oxygen contained in reference air. This enables the measurement of the concentration of the nitrogen oxide component in the measurement target gas.

Furthermore, the second solid electrolyte layer 6, the spacer layer 5, the first solid electrolyte layer 4, the third substrate layer 3, the external pump electrode 23, and the reference electrode 42 constitute an electro-chemical sensor cell 83. The gas sensor element 100 is configured to be capable of detecting the oxygen partial pressure in the measurement target gas outside the sensor, based on an electromotive force Vref obtained by the sensor cell 83.

In the gas sensor element 100 having the above-described configuration, when the main pump cell 21 and the auxiliary pump cell 50 operate, the measurement target gas whose oxygen partial pressure is always kept at a constant low value (a value that substantially does not affect the $NO_x$ measurement) can be supplied to the measurement pump cell 41. Accordingly, the gas sensor element 100 is configured to be capable of identifying the nitrogen oxide concentration in the measurement target gas, based on the pump current Ip2 that flows when oxygen generated through reduction of $NO_x$ is pumped out by the measurement pump cell 41, substantially in proportion to the nitrogen oxide concentration in the measurement target gas.

Furthermore, in order to improve the oxygen ion conductivity of the solid electrolyte, the gas sensor element 100 includes a heater 70 that serves to adjust the temperature of the gas sensor element 100 through heating and heat retention. In the example shown in FIG. 1, the heater 70 further includes a heater electrode 701, a heat generation unit 702, a lead portion 73, a heater insulating layer 74, and a pressure dispersing hole 75. The lead portion 73 may be provided in the form of a through hole.

In the present embodiment, the heater 70 is arranged in the gas sensor element 100 on the side closer to the lower face of the gas sensor element 100 than the upper face of the gas sensor element 100. In other words, the heater 70 is arranged at a position that is closer to the lower face of the gas sensor element 100 than the upper face of the gas sensor element 100 in the thickness direction (vertical direction/stacking direction) of the gas sensor element 100.

The heater electrode 701 is an electrode formed so as to be in contact with the lower face of the first substrate layer 1 (the lower face of the gas sensor element 100). When the heater electrode 701 is connected to an external power source, electricity can be supplied from the outside to the heater 70.

The heat generation unit 702 is an electrical resistor formed so as to be held between the second substrate layer 2 and the third substrate layer 3 from above and below. The heat generation unit 702 is connected via the lead portion 73 to the heater electrode 701, and, when electricity is supplied from the outside via the heater electrode 701, the heat generation unit 702 generates heat, thereby heating and keeping the temperature of a solid electrolyte constituting the gas sensor element 100.

Furthermore, the heat generation unit 702 is embedded over the entire region from the first internal cavity 20 to the second internal cavity 40, and thus the entire gas sensor element 100 can be adjusted to a temperature at which the above-described solid electrolyte is activated.

The heater insulating layer 74 is an insulating layer constituted by an insulating member made of alumina or the like on upper and lower faces of the heat generation unit 702. The heater insulating layer 74 is formed in order to realize electrical insulation between the second substrate layer 2 and the heat generation unit 702, and electrical insulation between the third substrate layer 3 and the heat generation unit 702.

The pressure dispersing hole 75 is a hole that extends through the third substrate layer 3 and is connected to the reference gas introduction space 43, and is formed in order to reduce an increase in internal pressure that accompanies an increase in the temperature in the heater insulating layer 74.

Porous Layer

Figure 2:
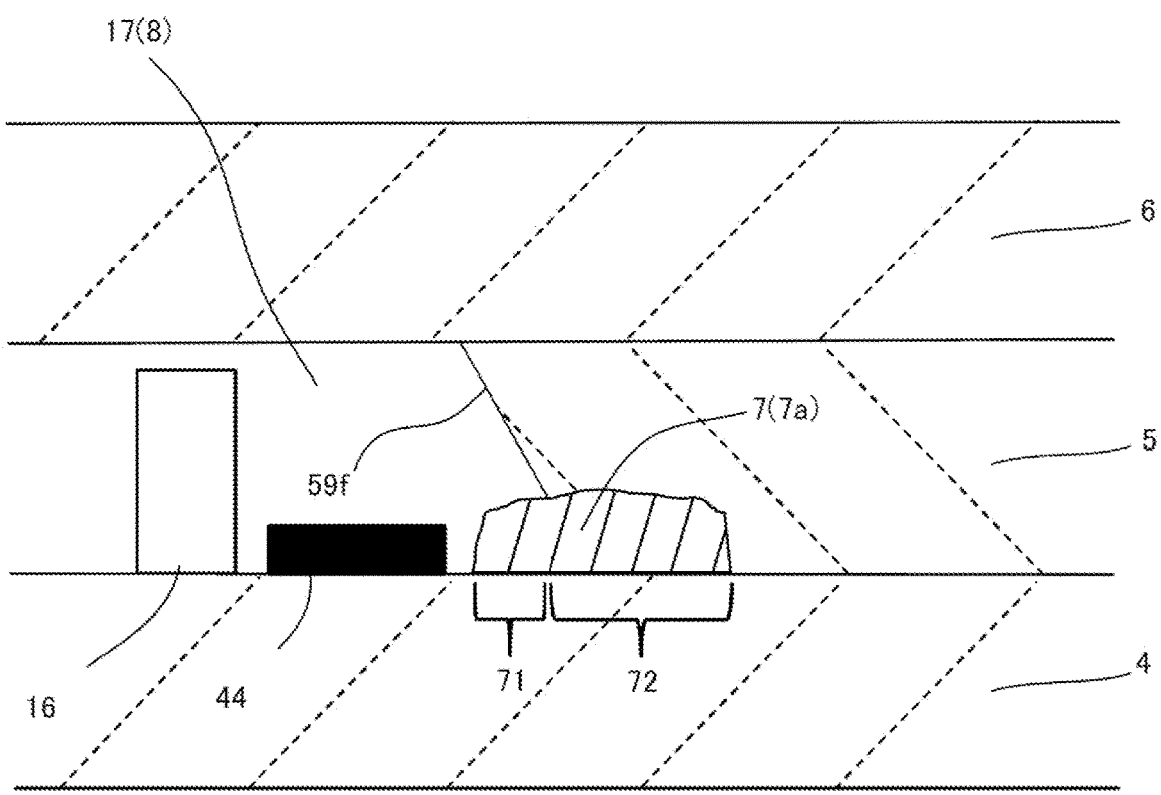
FIG. 2 is an enlarged view for describing a main part of the sensor element in FIG. 1.

FIG. 2 is an enlarged view for describing main portions of the gas sensor element 100 shown in FIG. 1. Specifically, FIG. 2 shows details of the first porous layer 7a (porous layer 7) and the spacer layer 5 that block the rear side of the third internal cavity 17 (target gas flow portion 8). As previously mentioned, the porous layer 7 is a porous layer having a porosity of 10% or more.

The first porous layer 7a (porous layer 7) illustrated in FIG. 2 faces the target gas flow portion 8 (third internal cavity 17), and is in contact with both the first solid electrolyte layer 4 and the front side face 59f of the spacer layer 5, which is the face that faces the target gas flow portion 8. In other words, the first porous layer 7a faces the target gas flow portion 8 and is in contact with the lower end of the front side face 59f of the spacer layer 5 and the upper face of the first solid electrolyte layer 4. It may be said that the first porous layer 7a is in contact with the lower end of the front side face 59f of the spacer layer 5 and faces the target gas flow portion 8 and the upper face of the first solid electrolyte layer 4.

The following effects can be expected from a configuration in which the first porous layer 7a, which faces the target gas flow portion 8, is arranged so as to be in contact with, and sandwiched between, the spacer layer 5 and the first solid electrolyte layer 4. Specifically, due to the first porous layer 7a being arranged between the spacer layer 5 and the first solid electrolyte layer 4, it is possible to expect an effect of lowering the Young's modulus of the gas sensor element 100 (particularly the laminate) and reducing stress that becomes concentrated in or near a corner portion of the target gas flow portion 8. In other words, due to providing the first porous layer 7a as a cushioning material between the spacer layer 5 and the first solid electrolyte layer 4, it is possible to expect an effect of preventing a situation in which stress becomes concentrated and a crack forms in or near a corner portion of the target gas flow portion 8.

Although described in detail later, the inventors of the present invention found through experimentation (a temperature rise test) that it is desirable that the first porous layer 7a (porous layer 7) has a porosity of 50% or less in order to sufficiently achieve an effect of suppressing cracking with use of the first porous layer 7a. As described above, the porosity of the first porous layer 7a (porous layer 7) is 10% or more, and therefore if the first porous layer 7a having a porosity of 10% or more and 50% or less is arranged at the position illustrated in FIGS. 1 and 2, it is possible to suppress the formation of cracks (breakdown of the target gas flow portion 8).

Here, in the gas sensor element 100, the thickness of the first porous layer 7a (porous layer 7) is 40 µm or less, for example. If the thickness of the first porous layer 7a, which is arranged so as to face the target gas flow portion 8, is too large, the amount of oxygen taken into the first porous layer 7a increases, and a longer time (light-off time) is required for oxygen to be pumped from or into the target gas flow portion 8 (particularly the space that the first porous layer 7a faces (the third internal cavity 17 in the example shown in FIG. 1)). Therefore, in consideration of the light-off time, it is desirable to keep the thickness of the first porous layer 7a to a predetermined value or lower, and the inventors of the present invention found that it is desirable to keep this thickness to 40 µm or less. By setting the thickness of the first porous layer 7a to 40 µm or less, the light-off time can be set to a time within a range that can withstand actual use (normal use) of the gas sensor element 100.

Also, in the gas sensor element 100, the thickness of the first porous layer 7a (porous layer 7) is 10 µm or more, for example. If the thickness of the first porous layer 7a is too small, it is not possible to expect the effects of preventing the concentration of stress with use of the first porous layer 7a, for example, and suppressing breakdown of (the formation of cracks in) the target gas flow portion 8. Therefore, it is desirable that the first porous layer 7a has a predetermined thickness, and the inventors of the present invention found that it is desirable that this thickness is 10 µm or more. According to this configuration, compared to the case where the thickness of the first porous layer 7a (porous layer 7) is less than 10 µm, it is possible to sufficiently achieve the effects of preventing the concentration of stress, for example, and suppressing breakdown of (the formation of cracks in) the target gas flow portion 8.

In the gas sensor element 100, the first porous layer 7a (porous layer 7) may be configured as a porous layer having a zirconia ($ZrO_2$) content of 50 wt % or more, for example. Here, as described above, the first porous layer 7a is in contact with the first solid electrolyte layer 4. The first solid electrolyte layer 4 is constituted by, for example, an oxygen-ion-conductive solid electrolyte layer made of zirconia or the like. For this reason, if the first porous layer 7a is made of a material similar to that of the first solid electrolyte layer 4, adhesion between the first porous layer 7a and the first solid electrolyte layer 4 can be improved. Accordingly, by setting the content percentage of zirconia in the first porous layer 7a to 50 wt % or more, it is possible to improve adhesion between the first porous layer 7a and the first solid electrolyte layer 4.

In the gas sensor element 100, the first porous layer 7a (porous layer 7) may be configured as an insulating layer, for example.

The following is an example of formation of the first porous layer 7a that is arranged so as to be in contact with, and sandwiched between, the lower end of the front side face 59f of the spacer layer 5 and the upper face of the first solid electrolyte layer 4 as illustrated in FIG. 2. Specifically, an adhesive layer that includes the porous layer 7 is used as an adhesive layer for adhering the upper face of the first solid electrolyte layer 4 and the lower face of the spacer layer 5. Then, the adhesive layer (porous layer 7) may be left remaining on the portion (and the vicinity thereof) that is located at the lower end of the front side face 59f of the spacer layer 5, which faces the target gas flow portion 8 (third internal cavity 17), thus forming the first porous layer 7a illustrated in FIG. 2.

In other words, the first porous layer 7a may be formed by leaving the adhesive layer, which includes the porous layer 7 and is for adhering the upper face of the first solid electrolyte layer 4 and the lower face of the spacer layer 5, in a portion (and the vicinity thereof) located at the lower end of one of the side faces 59 of the spacer layer 5 that faces the target gas flow portion 8.

In FIG. 2, the first porous layer 7a faces the target gas flow portion 8 (third internal cavity 17) while being in contact with, and sandwiched between, the lower end of the front side face 59f of the spacer layer 5 and the upper face of the first solid electrolyte layer 4. It may also be said that the first porous layer 7a faces the target gas flow portion 8 while being sandwiched between the lower end of the front side face 59f of the spacer layer 5 and the upper face of the first solid electrolyte layer 4 such that they do not come into contact with each other.

Here, as described with reference to FIG. 1, in the gas sensor element 100, the target gas flow portion 8 includes one or more chambers into or from which oxygen is pumped, that is to say includes the first internal cavity 20, the second internal cavity 40, and the third internal cavity 17, for example. The first porous layer 7a illustrated in FIG. 2 includes an exposed portion 71, which is a portion that faces the third internal cavity 17, and an unexposed portion 72, which is a portion that does not face the third internal cavity 17.

The exposed portion 71 is a portion that extends inside the target gas flow portion 8 (third internal cavity 17), that is to say, a portion that is exposed to the interior of the target gas flow portion 8 (third internal cavity 17). The exposed portion 71 illustrated in FIG. 2 extends inside the target gas flow portion 8 (third internal cavity 17), and is in contact with both the front side face 59f of the spacer layer 5 and the first solid electrolyte layer 4. It may be said that the exposed portion 71 is in contact with the lower end of the front side face 59f of the spacer layer 5 and faces the target gas flow portion 8 and the upper face of the first solid electrolyte layer 4. The exposed portion 71 is a portion that extends into the target gas flow portion 8 from a position at which an end portion (lower end, upper end) of a side face 59 of the spacer layer 5 that faces the target gas flow portion 8 is in contact with the face of the porous layer 7 that faces the target gas flow portion 8. The exposed portion 71 illustrated in FIG. 2 extends into the target gas flow portion 8 from the position at which the lower end of the front side face 59f of the spacer layer 5 is in contact with the face of the porous layer 7 that faces the target gas flow portion 8, and the exposed portion 71 faces the upper face of the first solid electrolyte layer 4.

In the first porous layer 7a illustrated in FIG. 2, the volume of the exposed portion 71 extending inside the third internal cavity 17 is 5% or more and 30% or less of the volume of the third internal cavity 17, for example.

In the first porous layer 7a illustrated in FIG. 2, if the volume of the exposed portion 71 is larger than 30% of the volume of the third internal cavity 17, the time required for oxygen to be pumped from or into the third internal cavity 17 (light-off time) increases. In consideration of the light-off time, it is desirable that the volume of the exposed portion 71 of the first porous layer 7a is 30% or less of the volume of the third internal cavity 17. Also, the inventors of the present invention found through later-described experimentation (temperature rise test) that if the volume of the exposed portion 71 of the first porous layer 7a is set to 5% or more of the volume of the third internal cavity 17, it is possible to effectively suppress the formation of cracks. Therefore, if the volume of the exposed portion 71 of the first porous layer 7a is set to 5% or more and 30% or less of the volume of the third internal cavity 17, it is possible to effectively suppress the breakdown of (the formation of cracks in) the target gas flow portion 8.

The unexposed portion 72 is a portion of the porous layer 7 that is located between the spacer layer 5 and the first solid electrolyte layer 4, and is a portion that is in contact with (faces) both the spacer layer 5 and the first solid electrolyte layer 4 but does not face the target gas flow portion 8 (third internal cavity 17). The unexposed portion 72 illustrated in FIG. 2 is sandwiched between the spacer layer 5 and the first solid electrolyte layer 4. The unexposed portion 72 includes a portion that extends into the spacer layer 5 from a location where an end portion (lower end, upper end) of a side face 59 of the spacer layer 5 that faces the target gas flow portion 8 is in contact with the face of the porous layer 7 that faces the target gas flow portion 8. The unexposed portion 72 illustrated in FIG. 2 extends into the spacer layer 5 from a position where the lower end of the front side face 59f of the spacer layer 5 is in contact with the face of the porous layer 7 that faces the target gas flow portion 8, and the unexposed portion 72 faces the upper face of the first solid electrolyte layer 4.

According to this configuration, the unexposed portion 72 is arranged so as to be in contact with, and sandwiched between, the spacer layer 5 and the first solid electrolyte layer 4, and thus the unexposed portion 72 can be used as a cushioning material between the spacer layer 5 and the first solid electrolyte layer 4.

However, if the volume of the unexposed portion 72 is too small, the unexposed portion 72 cannot sufficiently achieve the effect of a cushioning material between the spacer layer 5 and the first solid electrolyte layer 4. Therefore, it is desirable that the unexposed portion 72 has a predetermined volume. Therefore, the inventors of the present invention repeatedly examined the volume of the unexposed portion 72, and found that the volume of the unexposed portion 72 is desirably 10% or more of the volume of the porous layer 7 that includes the unexposed portion 72.

In view of this, in the first porous layer 7a illustrated in FIG. 2, the volume of the unexposed portion 72 is 10% or more of the volume of the first porous layer 7a illustrated in FIG. 2, for example. Accordingly, by setting the volume of the unexposed portion 72 to 10% or more of the volume of the porous layer 7 that includes the unexposed portion 72, it is possible to prevent a situation in which stress becomes concentrated and a crack forms in or near a corner portion of the target gas flow portion 8.

Note that a second porous layer 7b (porous layer 7) described below using FIG. 5 and the like desirably also has a porosity of 10% or more and 50% or less, and has a thickness of 10 μm or more and 40 μm or less, similarly to the first porous layer 7a. Also, similarly to the first porous layer 7a, the second porous layer 7b (porous layer 7) may be configured as a porous layer having a zirconia content of 50 wt % or more, for example, and may be configured as an insulating layer, for example. Further, if the second porous layer 7b (porous layer 7) also includes the unexposed portion 72 similarly to the first porous layer 7a, the volume of the unexposed portion 72 is 10% or more of the volume of the porous layer 7 (second porous layer 7b) that includes the unexposed portion 72, for example.

FIGS. 1 and 2 show an example of the first porous layer 7a (porous layer 7) that faces the third internal cavity 17 (target gas flow portion 8) and is in contact with the front side face 59f of the spacer layer 5. However, the porous layer 7 that faces the third internal cavity 17 may be in contact with at least either the right side face 59r or the left side face 59l of the spacer layer 5 that partitions the third internal cavity 17 (target gas flow portion 8). Also, if the gas introduction opening 10 is not arranged at the front side face of the gas sensor element 100, the porous layer 7 that faces the target gas flow portion 8 may be in contact with the rear side face 59b of the spacer layer 5 that partitions the front side of the target gas flow portion 8.

Characteristics

As described with reference to FIG. 1, the gas sensor element 100 includes the laminate that is provided with the target gas flow portion 8, which is an internal space for the introduction of a measurement target gas, and one or more porous layers 7 arranged so as to face the target gas flow portion 8. The laminate is constituted by the first solid electrolyte layer 4, the second solid electrolyte layer 6, and the spacer layer 5. In the laminate, the first solid electrolyte layer 4 and the second solid electrolyte layer 6 are stacked with the spacer layer 5 arranged therebetween, and thus the target gas flow portion 8 is provided between the first solid electrolyte layer 4 and the second solid electrolyte layer 6.

The one or more porous layers 7 provided in the gas sensor element 100 so as to face the target gas flow portion 8 include at least either the first porous layer 7a illustrated in FIGS. 1 and 2 or the second porous layer 7b described with reference to FIGS. 5, 7, and 8. The first porous layer 7a is in contact with both the first solid electrolyte layer 4 and at least one side face 59 of the spacer layer 5 that faces the target gas flow portion 8 (e.g., at least one face among the front side face 59f, the rear side face 59b, the right side face 59r, and the left side face 59l). In other words, the first porous layer 7a is in contact with both the first solid electrolyte layer 4 and at least one side face 59 of the spacer layer 5 that faces the target gas flow portion 8, and is arranged so as to face the target gas flow portion 8. The second porous layer 7b is in contact with both the second solid electrolyte layer 6 and at least one side face 59 of the spacer layer 5 that faces the target gas flow portion 8 (e.g., at least one face among the front side face 59f, the rear side face 59b, the right side face 59r, and the left side face 59l). In other words, the second porous layer 7b is in contact with both the second solid electrolyte layer 6 and at least one side face 59 of the spacer layer 5 that faces the target gas flow portion 8, and is arranged so as to face the target gas flow portion 8. The one or more porous layers 7 included in the gas sensor element 100 each have a porosity of 10% or more and 50% or less.

In this configuration, the first porous layer 7a is arranged so as to face the internal space at a location that corresponds to a corner portion of an internal space in a conventional gas sensor element, particularly a corner portion formed at a boundary between the spacer layer and the first solid electrolyte layer (contact point between the spacer layer and the first solid electrolyte layer). Similarly, the second porous layer 7b is arranged so as to face the internal space at a location that corresponds to a corner portion of an internal space in a conventional gas sensor element, particularly a corner portion formed at a boundary between the spacer layer and the second solid electrolyte layer (contact point between the spacer layer and the second solid electrolyte layer). In other words, at least either the first porous layer 7a or the second porous layer 7b is arranged so as to face the internal space at a location corresponding to a corner portion of an internal space in a conventional gas sensor element. Due to at least either the first porous layer 7a or the second porous layer 7b being arranged as described above, that is to say due to the porous layer 7, it is possible to reduce stress that becomes concentrated at a location corresponding to a corner portion of the internal space in a conventional gas sensor element.

Also, the inventors of the present invention found through experimentation (a temperature rise test described later) that if the porosity of the porous layer 7 is set to 50% or less, the porous layer 7 can suppress the formation of cracks. Also, due to the characteristic of being "porous", the porous layer 7 has a porosity of 10% or more. For this reason, the porosity of the porous layer 7 (the first porous layer 7a and the second porous layer 7b) is 10% or more and 50% or less.

Accordingly, with the gas sensor element 100, it is possible to prevent a situation in which a crack forms in or near a corner portion and the internal space (target gas flow portion 8) suffers breakdown, and the gas sensor element 100 can be used for a relatively long period of time without leading to a problem even in a harsh usage environment.

In the gas sensor element 100, it is desirable that the porous layer 7 is arranged so as to face the target gas flow portion 8, and is arranged so as to face at least either the first internal cavity 20, the second internal cavity 40, or the third internal cavity 17 included in the target gas flow portion 8, for example. In other words, the porous layer 7 need only face at least one chamber of the target gas flow portion 8 (internal space) into or from which oxygen is pumped (the first internal cavity 20, the second internal cavity 40, or the third internal cavity 17).

In the gas sensor element 100, it is desirable that the first porous layer 7a is in contact with the first solid electrolyte layer 4 and at least one side face 59 of the spacer layer 5 that faces the target gas flow portion 8, and is arranged so as to face the target gas flow portion 8. It is desirable that the first porous layer 7a is in contact with the upper face of the first solid electrolyte layer 4 and the lower end of the front side face 59f, the rear side face 59b, the right side face 59r, or the left side face 59l, and is arranged so as to face the target gas flow portion 8.

In the gas sensor element 100, it is desirable that the second porous layer 7b is in contact with the second solid electrolyte layer 6 and at least one side face 59 of the spacer layer 5 that faces the target gas flow portion 8, and is arranged so as to face the target gas flow portion 8. It is desirable that the second porous layer 7b is in contact with the lower face of the second solid electrolyte layer 6 and the upper end of a side face out of the front side face 59f, the rear side face 59b, the right side face 59r, and the left side face 59l, and is arranged so as to face the target gas flow portion 8.

Modified Examples

Although an embodiment of the present invention has been described above, the foregoing description of the embodiment is to be construed in all respects as illustrative of the present invention. Various improvements and modified examples may be made to the above embodiment. Omission, substitution, and/or addition of constituent elements in the above embodiment may be made as appropriate. Moreover, the shape and the dimensions of constituent elements in the above embodiment may be changed as appropriate according to the implementation. For example, changes such as the following can be made. Note that in the following, constituent elements the same as those in the above embodiment are given the same reference numerals, and description of aspects similar to those of the above embodiment will be omitted as appropriate. The modified examples described below can be combined as appropriate.

Extension into Target Gas Flow Portion

Figure 3:
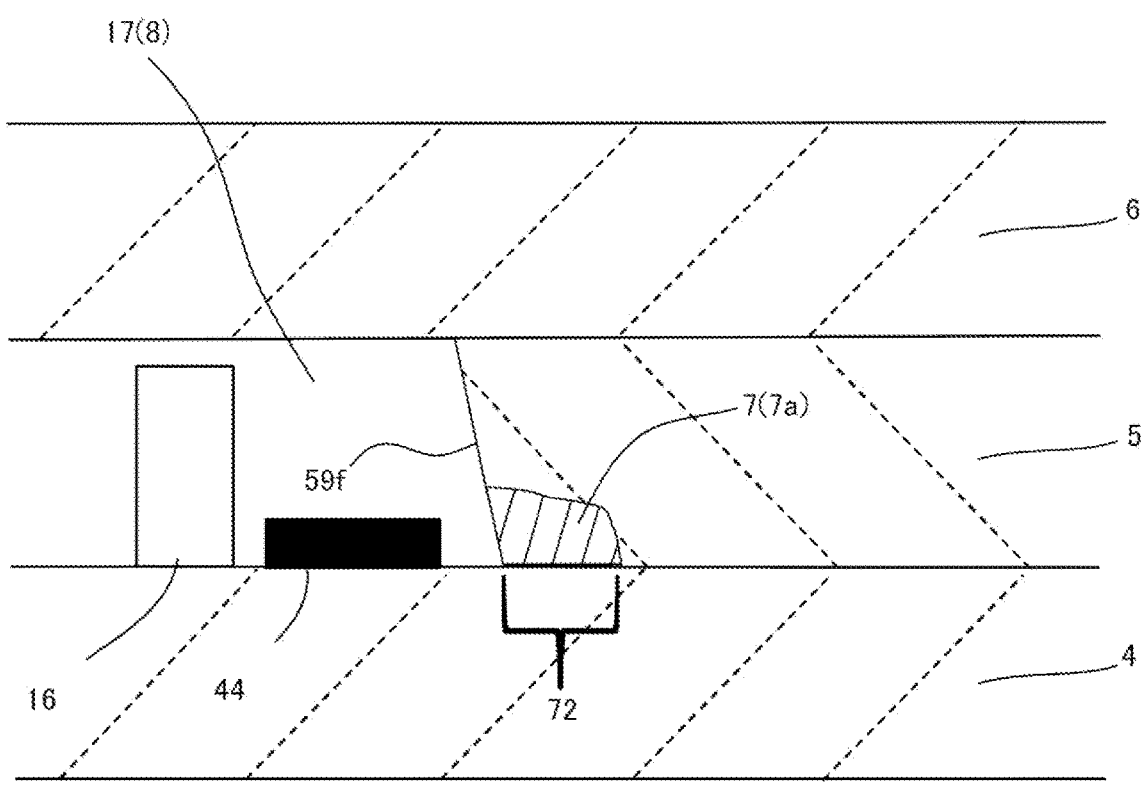
FIG. 3 is a schematic cross-sectional view schematically showing the configuration of the sensor element according to a modified example, and shows an example in which a first porous layer does not extend into a target gas flow portion.

FIG. 3 is a schematic cross-sectional view schematically showing the configuration of the gas sensor element 100 according to a modified example, and shows an example in which the first porous layer 7a does not extend into the target gas flow portion 8. The porous layer 7 (first porous layer 7a) illustrated in FIGS. 1 and 2 includes the exposed portion 71, which is a portion that extends into the target gas flow portion 8 (third internal cavity 17). However, it is not essential that the porous layer 7 includes the exposed portion 71, and the porous layer 7 may include the unexposed portion 72 and not include the exposed portion 71 as illustrated in FIG. 3, for example.

Specifically, the first porous layer 7a (porous layer 7) illustrated in FIG. 3 is in contact with both the first solid electrolyte layer 4 and the front side face 59f of the spacer layer 5, similarly to the porous layer 7 (first porous layer 7a) illustrated in FIGS. 1 and 2. In other words, the first porous layer 7a illustrated in FIG. 3 is in contact with the lower end of the front side face 59f of the spacer layer 5, and is in contact with (faces) the upper face of the first solid electrolyte layer 4. Also, the first porous layer 7a illustrated in FIG. 3 faces the target gas flow portion 8 (the third internal cavity 17), but the first porous layer 7a does not extend into the target gas flow portion 8, that is to say, does not include the exposed portion 71.

As illustrated in FIG. 3, it is desirable that the first porous layer 7a (porous layer 7) is in contact with the first solid electrolyte layer 4 and at least one side face (e.g., the front side face 59f) of the spacer layer 5 that faces the target gas flow portion 8, and also faces the target gas flow portion 8. The first porous layer 7a does not need to extend into the target gas flow portion 8, that is to say, does not need to include the exposed portion 71 that extends into the target gas flow portion 8.

Similarly, it is desirable that the second porous layer 7b (porous layer 7), which will be described later with reference to FIG. 5 and the like, is in contact with the second solid electrolyte layer 6 and at least one side face (e.g., the front side face 59f) of the spacer layer 5 that faces the target gas flow portion 8, and also faces the target gas flow portion 8. The second porous layer 7b does not need to extend into the target gas flow portion 8, that is to say, does not need to include the exposed portion 71 that extends into the target gas flow portion 8.

Need to Overlap Portion of Face of Electrode that Faces Target Gas Flow Portion

Figure 4:
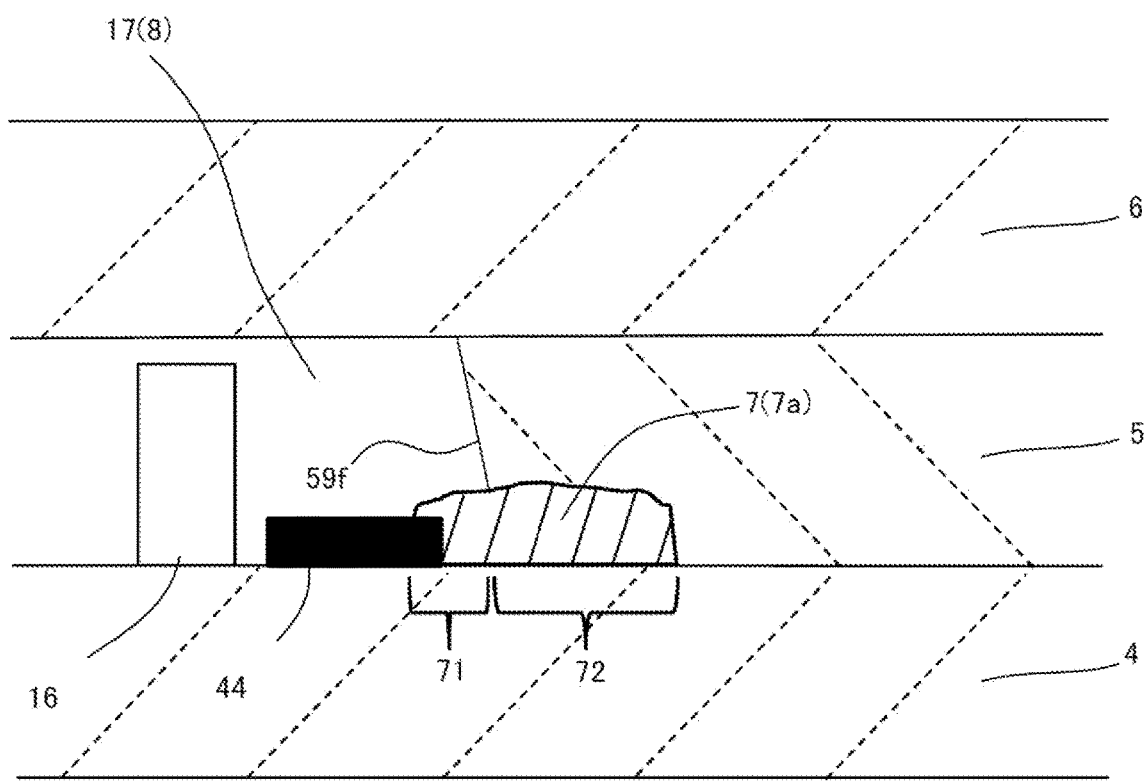
FIG. 4 is a schematic cross-sectional view schematically showing the configuration of the sensor element according to a modified example, and shows an example in which the first porous layer overlaps a portion of the upper face of a measurement electrode 44.

FIG. 4 is a schematic cross-sectional view schematically showing the configuration of the gas sensor element 100 according to a modified example, and shows an example in which the first porous layer 7a overlaps a portion of the upper face of the measurement electrode 44. The porous layer 7 (first porous layer 7a) illustrated in FIGS. 1 and 2 does not overlap a face of the measurement electrode 44 that faces the target gas flow portion 8 (third internal cavity 17). However, as illustrated in FIG. 4, the first porous layer 7a (porous layer 7) may overlap a portion of a face of the measurement electrode 44 that faces the target gas flow portion 8 (third internal cavity 17).

Specifically, the first porous layer 7a (porous layer 7) may overlap at least a portion of an opposing face of an electrode (e.g., the measurement electrode 44) disposed inside the target gas flow portion 8, the opposing face being on the side opposite to the face that is in contact with (faces) the first solid electrolyte layer 4. In the example shown in FIG. 4, the first porous layer 7a overlaps a portion of the upper face of the measurement electrode 44.

Similarly, the second porous layer 7b (porous layer 7) may overlap at least a portion of an opposing face of an electrode (e.g., the ceiling electrode portion 22a or the ceiling electrode portion 51a) disposed inside the target gas flow portion 8, the opposing face being on the side opposite to the face that is in contact with (faces) the second solid electrolyte layer 6. FIGS. 7 and 8 will be referenced later for a detailed description of the configuration in which the second porous layer 7b overlaps at least a portion of an opposing face of an electrode disposed inside the target gas flow portion 8, the opposing face being on the side opposite to the face that is in contact with (faces) the second solid electrolyte layer 6.

Here, the inventors of the present invention noticed that problems such as the following may occur with respect to an electrode disposed inside the target gas flow portion 8. Specifically, if platinum (Pt) is used for the electrode, for example, platinum oxide may be produced when the gas sensor element is repeatedly used for a long time. Since platinum oxide is more likely to vaporize than platinum at high temperatures, the vaporization of platinum oxide may cause peeling to occur at the interface between the electrode and the solid electrolyte layer (first solid electrolyte layer 4 or second solid electrolyte layer 6) that is in contact with the electrode. The inventors of the present invention noticed that there is a problem that the electrode disposed inside the target gas flow portion 8 becomes peeled away from the solid electrolyte layer due to the above-mentioned causes, which may lead to a problem in detection by the gas sensor element. In particular, if the gas sensor element is used as an exhaust gas sensor, the electrode disposed inside the target gas flow portion 8 is often exposed to high temperatures, and therefore, peeling from the solid electrolyte layer is likely to occur.

In view of this, the inventors of the present invention considered preventing the peeling of the electrode by arranging the porous layer 7 so as to overlap at least a portion of an opposing face of the electrode disposed inside the target gas flow portion 8, the opposing face being on the side opposite to the face in contact with the solid electrolyte layer. Specifically, the inventors thought that, by using the porous layer 7 to press the electrode against the solid electrolyte layer that is in contact with the electrode, it may be possible to prevent the electrode from becoming peeled away from the solid electrolyte layer. The inventors of the present invention found through experimentation (later-described electrode peeling test) that peeling of the electrode can be suppressed by arranging the porous layer 7 so as to overlap at least a portion of an opposing face of the electrode, which is on the side opposite to the face that is in contact with the solid electrolyte layer.

Therefore, according to the above configuration, it is possible to provide a gas sensor element in which the electrode can be prevented from peeling from the solid electrolyte layer that is in contact with the electrode, and that can be used for a relatively long period of time without leading to a problem even in a harsh usage environment.

In the gas sensor element 100 illustrated in FIG. 4, the first porous layer 7a (porous layer 7) overlaps a portion of an opposing face of the measurement electrode 44 disposed inside the target gas flow portion 8 (third internal cavity 17), the opposing face being on the side opposite to the face that is in contact with (faces) the first solid electrolyte layer 4. Accordingly, in the gas sensor element 100, it is possible to prevent the measurement electrode 44 from peeling off from the first solid electrolyte layer 4 in contact with the measurement electrode 44, and the gas sensor element 100 can be used for a relatively long period of time without leading to a problem even in a harsh usage environment.

In the gas sensor element 100 illustrated in FIG. 4, the area of the portion of the measurement electrode 44 overlapped by the first porous layer 7a is 0.5% or more and 20% or less of the area of the opposing face of the measurement electrode 44 on the side opposite to the face that is in contact with the first solid electrolyte layer 4.

Here, if the area of the portion overlapped by the first porous layer 7a is greater than 20% of the total area of the opposing face of the measurement electrode 44 on the side opposite to the face that is in contact the first solid electrolyte layer 4, the performance of the measurement electrode 44 (e.g., detection accuracy) may degrade. In view of this, the area of the portion of the measurement electrode 44 overlapped by the first porous layer 7a is 20% or less of the area of the opposing face of the measurement electrode 44 on the side opposite to the face that is in contact with the first solid electrolyte layer 4.

Also, the inventors of the present invention found through experimentation (an electrode peeling test) that if the area of the portion of the measurement electrode 44 overlapped by the first porous layer 7a is 0.5% or more of the area of the opposing face of the measurement electrode 44 on the side opposite to the face that is in contact with the first solid electrolyte layer 4, it is possible to effectively suppress peeling of the measurement electrode 44.

In other words, if the area of the portion of the measurement electrode 44 overlapped by the first porous layer 7a is 0.5% or more and 20% or less of the area of the face of the measurement electrode 44 that is in contact with the first solid electrolyte layer 4, it is possible to effectively suppress peeling of the measurement electrode 44 while also preventing degradation of the performance of the measurement electrode 44. Accordingly, with the gas sensor element 100, it is possible to effectively suppress the peeling of the measurement electrode 44 while also preventing degradation of the performance of the measurement electrode 44, and the gas sensor element 100 can be used for a relatively long period of time without leading to a problem even in a harsh usage environment. Details of the electrode peeling test will be described later.

Example of Inclusion of Second Porous Layer

Figure 5:
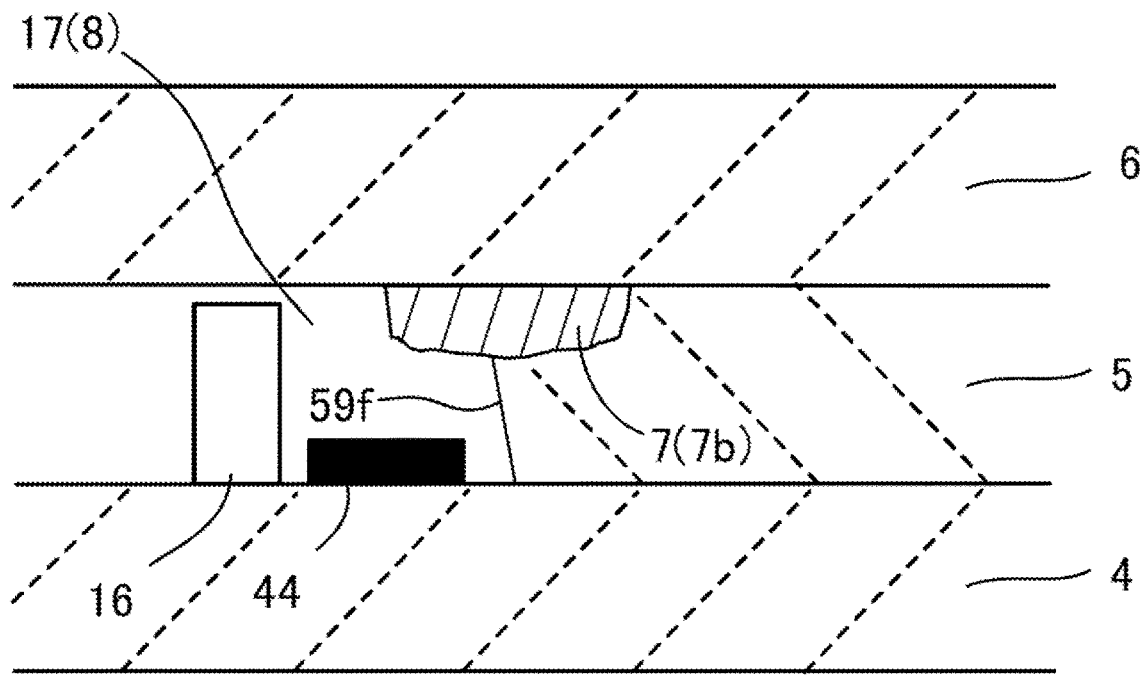
FIG. 5 is a schematic cross-sectional view schematically showing the configuration of the gas sensor element according to a modified example, and shows an example in which a second porous layer is in contact with a second solid electrolyte layer and the front side face of a spacer layer that faces a third internal cavity.

FIG. 5 is a schematic cross-sectional view schematically showing the configuration of the gas sensor element 100 according to a modified example, and shows an example in which the second porous layer 7b is in contact with the second solid electrolyte layer 6 and the front side face 59f of the spacer layer 5 that faces the third internal cavity 17. The gas sensor elements 100 described above with reference to FIGS. 1 to 4 include the first porous layer 7a that faces the target gas flow portion 8 (third internal cavity 17) and is in contact with the front side face 59f of the spacer layer 5 and the first solid electrolyte layer 4. However, the porous layer 7 included in the gas sensor element 100 is not limited to being the first porous layer 7a, and may be the second porous layer 7b. The gas sensor element 100 illustrated in FIG. 5 includes the second porous layer 7b that faces the target gas flow portion 8 (third internal cavity 17) and is in contact with the front side face 59f of the spacer layer 5 and the second solid electrolyte layer 6.

Specifically, as illustrated in FIG. 5, the second porous layer 7b faces the target gas flow portion 8 (third internal cavity 17), and is in contact with both the front side face 59f of the spacer layer 5 and the second solid electrolyte layer 6. More specifically, the second porous layer 7b faces the target gas flow portion 8 and is in contact with the upper end of the front side face 59f of the spacer layer 5 and the lower face of the second solid electrolyte layer 6. It can also be said that the second porous layer 7b is in contact with the upper end of the front side face 59f of the spacer layer 5 and faces the target gas flow portion 8 and the lower face of the second solid electrolyte layer 6.

The following is an example of formation of the second porous layer 7b that is arranged so as to be in contact with, and sandwiched between, the upper end of the front side face 59f of the spacer layer 5 and the lower face of the second solid electrolyte layer 6 as illustrated in FIG. 5. Specifically, an adhesive layer that includes the porous layer 7 is used as an adhesive layer for adhering the lower face of the second solid electrolyte layer 6 and the upper face of the spacer layer 5. Then, the adhesive layer (porous layer 7) may be left remaining on the portion (and the vicinity thereof) that is located at the upper end of the front side face 59f of the spacer layer 5, which faces the target gas flow portion 8 (third internal cavity 17), thus forming the second porous layer 7b illustrated in FIG. 5.

In other words, the second porous layer 7*b* may be formed by leaving the adhesive layer, which includes the porous layer 7 and is for adhering the lower face of the second solid electrolyte layer 6 and the upper face of the spacer layer 5, in a portion (and the vicinity thereof) located at the upper end of one of the side faces 59 of the spacer layer 5 that faces the target gas flow portion 8.

Figure 7:
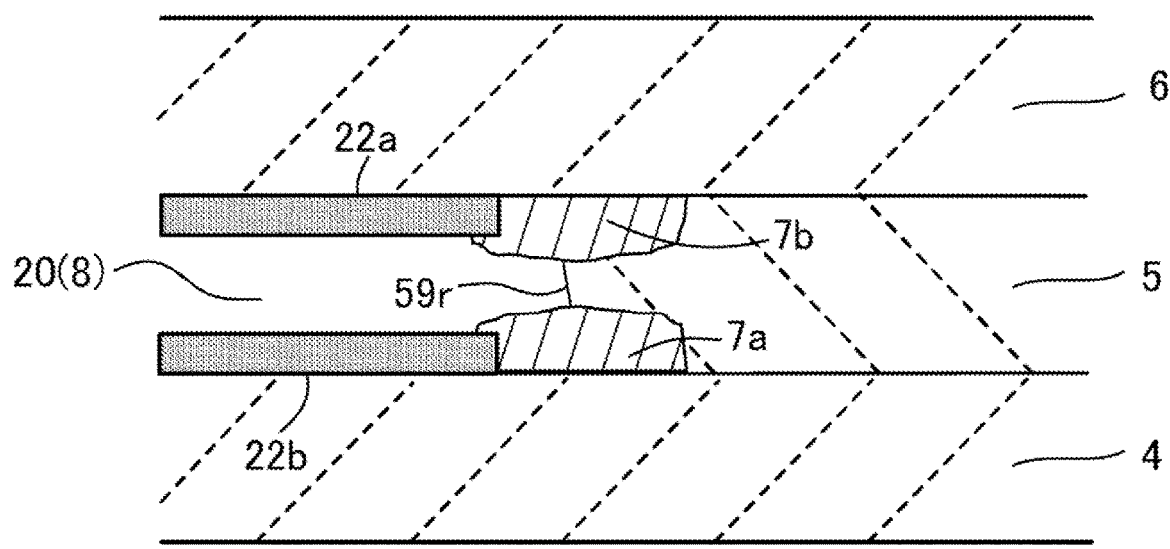
FIG. 7 is a schematic cross-sectional view schematically showing the configuration of the gas sensor element according to a modified example, and shows an example in which a porous layer is in contact with the right side face of the spacer layer that faces the first internal cavity.
Figure 8:
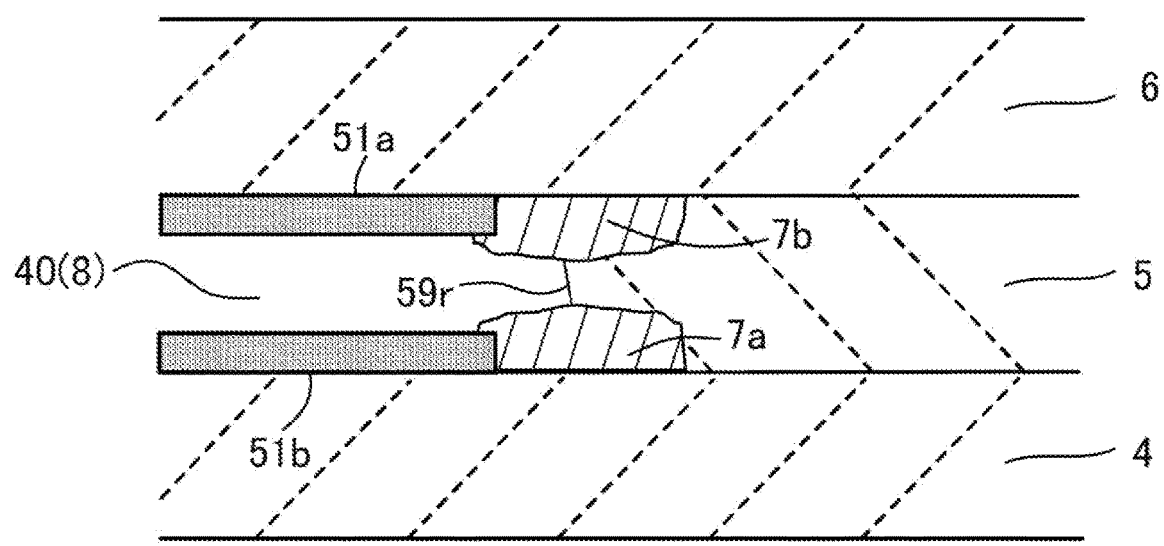
FIG. 8 is a schematic cross-sectional view schematically showing the configuration of the gas sensor element according to a modified example, and shows an example in which a porous layer is in contact with the right side face of the spacer layer that faces the second internal cavity.

In one example, the second porous layer 7*b* may be arranged so as to be in contact with the lower face of the second solid electrolyte layer 6 and the upper end of the side face 59 of the spacer layer 5 that faces the target gas flow portion 8, and so as to face the target gas flow portion 8, as illustrated in FIGS. 5, 7, and 8. In other words, the second porous layer 7*b* that faces the target gas flow portion 8 may be arranged so as to be in contact with, and sandwiched between, the spacer layer 5 and the second solid electrolyte layer 6. In this configuration, due to the second porous layer 7*b* that is arranged between the spacer layer 5 and the second solid electrolyte layer 6, it is possible to lower the Young's modulus of the gas sensor element (particularly the laminate) and reduce stress that becomes concentrated in or near a corner portion of the internal space. In other words, due to arranging the second porous layer 7*b* as a cushioning material between the spacer layer 5 and the second solid electrolyte layer 6, it is possible to prevent a situation in which stress becomes concentrated and a crack forms in or near a corner portion of the target gas flow portion 8.

In the second porous layer 7*b* (porous layer 7) illustrated in FIG. 5, similarly to the first porous layer 7*a*, it is desirable that the porosity is 10% or more and 50% or less, and that the thickness is 10 µm or more and 40 µm or less. If the thickness of the second porous layer 7*b*, which is arranged so as to face the target gas flow portion 8, is too large, the amount of oxygen taken into the second porous layer 7*b* increases, and a longer time (light-off time) is required for oxygen to be pumped from or into the target gas flow portion 8 (particularly the space that the second porous layer 7*b* faces (the third internal cavity 17 in the example shown in FIG. 5)). Therefore, in consideration of the light-off time, it is desirable to keep the thickness of the second porous layer 7*b* to a predetermined value or lower, and the inventors of the present invention found that it is desirable to keep this thickness to 40 µm or less. By setting the thickness of the second porous layer 7*b* to 40 µm or less, the light-off time can be set to a time within a range that can withstand actual use (normal use) of the gas sensor element 100. Also, similarly to the first porous layer 7*a*, the second porous layer 7*b* (porous layer 7) may be configured as a porous layer having a zirconia content of 50 wt % or more, for example. As described above, the second porous layer 7*b* is in contact with the second solid electrolyte layer 6. Also, the second solid electrolyte layer 6 is constituted by, for example, an oxygen-ion-conductive solid electrolyte layer made of zirconia or the like. Therefore, if the second porous layer 7*b* is made of a material similar to that of the second solid electrolyte layer 6, adhesion between the second porous layer 7*b* and the second solid electrolyte layer 6 can be improved. Accordingly, setting the content of zirconia in the second porous layer 7*b* to 50 wt % or more makes it possible to improve adhesion between the second porous layer 7*b* and the second solid electrolyte layer 6. Also, the second porous layer 7*b* (porous layer 7) may be configured as an insulating layer, for example.

Similarly to the first porous layer 7*a* described with reference to FIGS. 1 and 2, the second porous layer 7*b* (porous layer 7) illustrated in FIG. 5 includes an exposed portion 71, which is a portion that faces the third internal cavity 17, and an unexposed portion 72, which is a portion that does not face the third internal cavity 17. In the second porous layer 7*b* illustrated in FIG. 5, the exposed portion 71 extends into the third internal cavity 17 from a position at which the upper end of the front side face 59*f* of the spacer layer 5 is in contact with the face of the second porous layer 7*b* that faces the target gas flow portion 8, and faces the lower face of the second solid electrolyte layer 6. In the second porous layer 7*b* illustrated in FIG. 5, the volume of the exposed portion 71 that extends into the third internal cavity 17 is 5% or more and 30% or less of the volume of the third internal cavity 17, for example.

In the second porous layer 7*b* (porous layer 7) illustrated in FIG. 5, the unexposed portion 72 is a portion of the second porous layer 7*b* that is located between the spacer layer 5 and the second solid electrolyte layer 6. The unexposed portion 72 is in contact with (faces) both the spacer layer 5 and the second solid electrolyte layer 6, and does not face the target gas flow portion 8 (third internal cavity 17). In the second porous layer 7*b* illustrated in FIG. 5, the unexposed portion 72 is a portion that extends into the spacer layer 5 from a position at which the upper end of the front side face 59*f* of the spacer layer 5 is in contact with the face of the porous layer 7 that faces the target gas flow portion 8, and faces the lower face of the second solid electrolyte layer 6. Also, in the second porous layer 7*b* illustrated in FIG. 5, the volume of the unexposed portion 72 is 10% or more of the volume of the second porous layer 7*b* illustrated in FIG. 5, for example.

The gas sensor element 100 need only include at least either the first porous layer 7*a* described with reference to FIGS. 1 to 4 or the second porous layer 7*b* described with reference to FIG. 5, but may include both the first porous layer 7*a* and the second porous layer 7*b*, for example.

Figure 6:
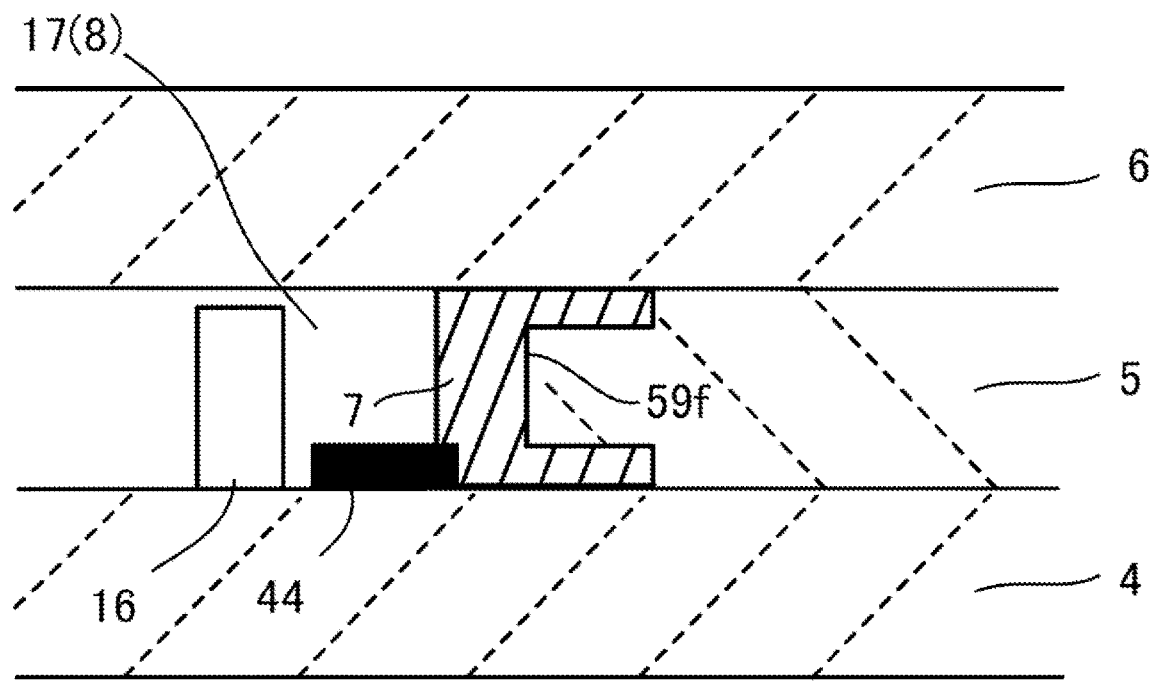
FIG. 6 is a schematic cross-sectional view schematically showing the configuration of the gas sensor element according to a modified example, and shows an example in which a porous layer is in contact with the first solid electrolyte layer, the second solid electrolyte layer, and the front side face of the spacer layer that faces the third internal cavity.

Example of Including Porous Layer in Contact with First Solid Electrolyte Layer and Second Solid Electrolyte Layer FIG. 6 is a schematic cross-sectional view schematically showing the configuration of the gas sensor element 100 according to a modified example, and shows an example in which the porous layer 7 is in contact with the first solid electrolyte layer 4, the second solid electrolyte layer 6, and the front side face 59*f* of the spacer layer 5 that faces the third internal cavity 17. The gas sensor elements 100 described above with reference to FIGS. 1 to 5 include the porous layer 7 that faces the target gas flow portion 8 (third internal cavity 17) and is in contact with the front side face 59*f* of the spacer layer 5 and either the first solid electrolyte layer 4 or the second solid electrolyte layer 6. However, the porous layer 7 included in the gas sensor element 100 is not limited to being in contact with either the first solid electrolyte layer 4 or the second solid electrolyte layer 6, and may be in contact with both the first solid electrolyte layer 4 and the second solid electrolyte layer 6.

The porous layer 7 illustrated in FIG. 6 faces the target gas flow portion 8 (third internal cavity 17), and is in contact with the first solid electrolyte layer 4, the second solid electrolyte layer 6, and the front side face 59*f* of the spacer layer 5 that faces the target gas flow portion 8. The porous layer 7 illustrated in FIG. 6 can be regarded as an example in which the first porous layer 7*a*, which faces the target gas flow portion 8 (third internal cavity 17) and is in contact with both the first solid electrolyte layer 4 and the front side face 59*f* of the spacer layer 5, is furthermore in contact with (faces) the second solid electrolyte layer 6. Also, the porous layer 7 illustrated in FIG. 6 can be regarded as an example in which the second porous layer 7b, which faces the target gas flow portion 8 (third internal cavity 17) and is in contact with both the second solid electrolyte layer 6 and the front side face 59f of the spacer layer 5, is furthermore in contact with (faces) the first solid electrolyte layer 4.

As illustrated in FIG. 6, the gas sensor element 100 may include the porous layer 7 that faces the target gas flow portion 8 (third internal cavity 17) and is in contact with the first solid electrolyte layer 4, the second solid electrolyte layer 6, and the front side face 59f of the spacer layer 5.

Similarly to the first porous layer 7a and the second porous layer 7b described above, it is desirable that the porous layer 7 illustrated in FIG. 6 has a porosity of 10% or more and 50% or less and a thickness of 10 μm or more and 40 μm or less, for example. Also, similarly to the first porous layer 7a and the second porous layer 7b, the porous layer 7 illustrated in FIG. 6 may be configured as a porous layer having a zirconia content of 50 wt % or more, for example, or may be configured as an insulating layer, for example.

Example of Including Porous Layer that Faces First Internal Cavity

FIG. 7 is a schematic cross-sectional view schematically showing the configuration of the gas sensor element 100 according to a modified example, and shows an example in which porous layers 7 (first porous layer 7a and second porous layer 7b) are in contact with the right side face 59r of the spacer layer 5 that faces the first internal cavity 20. The gas sensor elements 100 described above with reference to FIGS. 1 to 6 include a porous layer 7 that faces the target gas flow portion 8 (third internal cavity 17) and is in contact with the front side face 59f of the spacer layer 5 and at least either the first solid electrolyte layer 4 or the second solid electrolyte layer 6. However, the porous layer 7 included in the gas sensor element 100 is not limited to facing the third internal cavity 17. Also, the porous layer 7 included in the gas sensor element 100 is not limited to being in contact with the front side face 59f of the spacer layer 5.

The first porous layer 7a (porous layer 7) illustrated in FIG. 7 faces the target gas flow portion 8 (first internal cavity 20), and is in contact with both the first solid electrolyte layer 4 and the right side face 59r of the spacer layer 5 that faces the target gas flow portion 8. Specifically, the first porous layer 7a faces the target gas flow portion 8 and is in contact with the lower end of the right side face 59r of the spacer layer 5 and the upper face of the first solid electrolyte layer 4. It may be said that the first porous layer 7a is in contact with the lower end of the right side face 59r of the spacer layer 5 and faces the target gas flow portion 8 and the upper face of the first solid electrolyte layer 4.

Similarly, the second porous layer 7b (porous layer 7) illustrated in FIG. 7 faces the target gas flow portion 8 (first internal cavity 20), and is in contact with both the second solid electrolyte layer 6 and the right side face 59r of the spacer layer 5 that faces the target gas flow portion 8. Specifically, the second porous layer 7b faces the target gas flow portion 8 and is in contact with the upper end of the right side face 59r of the spacer layer 5 and the lower face of the second solid electrolyte layer 6. It may be said that the second porous layer 7b is in contact with the upper end of the right side face 59r of the spacer layer 5 and faces the target gas flow portion 8 and the lower face of the second solid electrolyte layer 6.

The first porous layer 7a (porous layer 7) illustrated in FIG. 7 overlaps at least a portion of an opposing face (upper face in the drawing) of the bottom electrode portion 22b disposed inside the target gas flow portion 8 (first internal cavity 20), the opposing face being on the side opposite to the face that is in contact with (faces) the first solid electrolyte layer 4.

Similarly, the second porous layer 7b (porous layer 7) illustrated in FIG. 7 overlaps at least a portion of an opposing face (lower face in the drawing) of the ceiling electrode portion 22a disposed inside the target gas flow portion 8 (first internal cavity 20), the opposing face being on the side opposite to the face that is in contact with (faces) the second solid electrolyte layer 6.

FIG. 7 shows an example in which the gas sensor element 100 includes the first porous layer 7a and the second porous layer 7b. However, the porous layer 7 included in the gas sensor element 100 may be at least either the first porous layer 7a or the second porous layer 7b, and need not include both the first porous layer 7a and the second porous layer 7b.

Also, in FIG. 7, the first porous layer 7a overlaps a portion of the upper face of the bottom electrode portion 22b, and the second porous layer 7b overlaps a portion of the lower face of the ceiling electrode portion 22a. However, in the gas sensor element 100, it is not essential that the first porous layer 7a overlaps a portion of the upper face of the bottom electrode portion 22b, and a configuration is possible in which the first porous layer 7a does not overlap a portion of the upper face of the bottom electrode portion 22b. Similarly, in the gas sensor element 100, it is not essential that the second porous layer 7b overlaps a portion of the lower face of the ceiling electrode portion 22a, and a configuration is possible in which the second porous layer 7b does not overlap a portion of the lower face of the ceiling electrode portion 22a.

Similarly to the first porous layer 7a and the second porous layer 7b described above, it is desirable that the first porous layer 7a and the second porous layer 7b illustrated in FIG. 7 each have a porosity of 10% or more and 50% or less, and a thickness of 10 μm or more and 40 μm or less, for example. Similarly to the first porous layer 7a and the second porous layer 7b described above, the first porous layer 7a and the second porous layer 7b illustrated in FIG. 7 may each be configured as a porous layer having a zirconia content of 50 wt % or more, for example. Also, similarly to the first porous layer 7a and the second porous layer 7b described above, the first porous layer 7a and the second porous layer 7b illustrated in FIG. 7 may each be configured as an insulating layer, for example.

Similarly to the first porous layer 7a and the second porous layer 7b described above with reference to FIGS. 1, 2, 4, and 5, the first porous layer 7a and the second porous layer 7b illustrated in FIG. 7 each include an exposed portion 71 and an unexposed portion 72.

In the first porous layer 7a illustrated in FIG. 7, the exposed portion 71 extends into the first internal cavity 20 from a position at which the lower end of the right side face 59r of the spacer layer 5 is in contact with the face of the first porous layer 7a that faces the first internal cavity 20, and faces the upper face of the first solid electrolyte layer 4. In the second porous layer 7b illustrated in FIG. 7, the exposed portion 71 extends into the first internal cavity 20 from a position at which the upper end of the right side face 59r of the spacer layer 5 is in contact with the face of the second porous layer 7b that faces the first internal cavity 20, and faces the lower face of the second solid electrolyte layer 6.

In FIG. 7, the sum of the volume of the exposed portion 71 of the first porous layer 7a and the volume of the exposed portion 71 of the second porous layer 7b is 5% or more and 30% or less of the volume of the first internal cavity 20, for example.

In the first porous layer 7a illustrated in FIG. 7, the unexposed portion 72 is a portion of the first porous layer 7a that is located between the spacer layer 5 and the first solid electrolyte layer 4, and does not face the first internal cavity 20 (target gas flow portion 8). The unexposed portion 72 of the first porous layer 7a illustrated in FIG. 7 extends into the spacer layer 5 from a position at which the lower end of the right side face 59r of the spacer layer 5 is in contact with the face of the first porous layer 7a that faces the first internal cavity 20, and faces the upper face of the first solid electrolyte layer 4. In the first porous layer 7a illustrated in FIG. 7, the volume of the unexposed portion 72 is 10% or more of the volume of the first porous layer 7a illustrated in FIG. 7, for example.

In the second porous layer 7b illustrated in FIG. 7, the unexposed portion 72 is a portion of the second porous layer 7b that is located between the spacer layer 5 and the second solid electrolyte layer 6, and does not face the first internal cavity 20 (target gas flow portion 8). The unexposed portion 72 of the second porous layer 7b illustrated in FIG. 7 extends into the spacer layer 5 from a position at which the upper end of the right side face 59r of the spacer layer 5 is in contact with the face of the second porous layer 7b that faces the first internal cavity 20, and faces the lower face of the second solid electrolyte layer 6. In the second porous layer 7b illustrated in FIG. 7, the volume of the unexposed portion 72 is 10% or more of the volume of the second porous layer 7b illustrated in FIG. 7, for example.

In the gas sensor element 100 illustrated in FIG. 7, the first porous layer 7a (porous layer 7) overlaps a portion of an opposing face of the bottom electrode portion 22b disposed inside the target gas flow portion 8 (first internal cavity 20), the opposing face being on the side opposite to the face that is in contact with (faces) the first solid electrolyte layer 4. In particular, in the gas sensor element 100 illustrated in FIG. 7, the area of the portion of the bottom electrode portion 22b overlapped by the first porous layer 7a is 0.5% or more and 20% or less of the area of the opposing face of the bottom electrode portion 22b on the side opposite to the face that is in contact with the first solid electrolyte layer 4.

Also, in the gas sensor element 100 illustrated in FIG. 7, the second porous layer 7b (porous layer 7) overlaps a portion of an opposing face of the ceiling electrode portion 22a disposed inside the target gas flow portion 8 (first internal cavity 20), the opposing face being on the side opposite to the face that is in contact with (faces) the second solid electrolyte layer 6. In particular, in the gas sensor element 100 illustrated in FIG. 7, the area of the portion of the ceiling electrode portion 22a overlapped by the second porous layer 7b is 0.5% or more and 20% or less of the area of the opposing face of the ceiling electrode portion 22a on the side opposite to the face that is in contact with the second solid electrolyte layer 6.

FIG. 7 shows an example in which a porous layer 7 (first porous layer 7a, second porous layer 7b) faces the first internal cavity 20 (target gas flow portion 8) and is in contact with the right side face 59r of the spacer layer 5. However, the porous layer 7 that faces the first internal cavity 20 may be in contact with the left side face 59l of the spacer layer 5 that defines the first internal cavity 20 (target gas flow portion 8). Also, if the gas introduction opening 10 is not arranged at the front side face of the gas sensor element 100, the porous layer 7 that faces the target gas flow portion 8 may be in contact with the rear side face 59b of the spacer layer 5 that partitions the front side of the target gas flow portion 8.

Example of Including Porous Layer that Faces Second Internal Cavity

FIG. 8 is a schematic cross-sectional view schematically showing the configuration of the gas sensor element 100 according to a modified example, and shows an example in which porous layers 7 (first porous layer 7a and second porous layer 7b) are in contact with the right side face 59r of the spacer layer 5 that faces the second internal cavity 40.

The first porous layer 7a (porous layer 7) illustrated in FIG. 8 faces the target gas flow portion 8 (second internal cavity 40), and is in contact with both the first solid electrolyte layer 4 and the right side face 59r of the spacer layer 5, which is the face that faces the target gas flow portion 8. Specifically, the first porous layer 7a faces the target gas flow portion 8 and is in contact with the lower end of the right side face 59r of the spacer layer 5 and the upper face of the first solid electrolyte layer 4. It may be said that the first porous layer 7a is in contact with the lower end of the right side face 59r of the spacer layer 5 and faces the target gas flow portion 8 and the upper face of the first solid electrolyte layer 4.

Similarly, the second porous layer 7b (porous layer 7) illustrated in FIG. 8 faces the target gas flow portion 8 (second internal cavity 40), and is in contact with both the second solid electrolyte layer 6 and the right side face 59r of the spacer layer 5, which is the face that faces the target gas flow portion 8. Specifically, the second porous layer 7b faces the target gas flow portion 8 and is in contact with the upper end of the right side face 59r of the spacer layer 5 and the lower face of the second solid electrolyte layer 6. It may be said that the second porous layer 7b is in contact with the upper end of the right side face 59r of the spacer layer 5 and faces the target gas flow portion 8 and the lower face of the second solid electrolyte layer 6.

The first porous layer 7a (porous layer 7) illustrated in FIG. 8 overlaps at least a portion of an opposing face (upper face in the drawing) of the bottom electrode portion 51b disposed inside the target gas flow portion 8 (second internal cavity 40), the opposing face being on the side opposite to the face that is in contact with (faces) the first solid electrolyte layer 4.

Similarly, the second porous layer 7b (porous layer 7) illustrated in FIG. 8 overlaps at least a portion of an opposing face (lower face in the drawing) of the ceiling electrode portion 51a disposed inside the target gas flow portion 8 (second internal cavity 40), the opposing face being on the side opposite to the face that is in contact with (faces) the second solid electrolyte layer 6.

FIG. 8 shows an example in which the gas sensor element 100 includes the first porous layer 7a and the second porous layer 7b. However, the porous layer 7 included in the gas sensor element 100 may be at least either the first porous layer 7a or the second porous layer 7b, and need not include both the first porous layer 7a and the second porous layer 7b.

Also, in FIG. 8, the first porous layer 7a overlaps a portion of the upper face of the bottom electrode portion 51b, and the second porous layer 7b overlaps a portion of the lower face of the ceiling electrode portion 51a. However, in the gas sensor element 100, it is not essential that the first porous layer 7a overlaps a portion of the upper face of the bottom electrode portion 51b, and the first porous layer 7a does not need to overlap a portion of the upper face of the bottom electrode portion 51b. Similarly, in the gas sensor element 100, it is not essential that the second porous layer 7b overlaps a portion of the lower face of the ceiling electrode portion 51a, and the second porous layer 7b does not need to overlap a portion of the lower face of the ceiling electrode portion 51a.

Similarly to the first porous layer 7a and the second porous layer 7b described above, it is desirable that the first porous layer 7a and the second porous layer 7b illustrated in FIG. 8 each have a porosity of 10% or more and 50% or less, and a thickness of 10 μm or more and 40 μm or less, for example. Similarly to the first porous layer 7a and the second porous layer 7b described above, the first porous layer 7a and the second porous layer 7b illustrated in FIG. 8 may each be configured as a porous layer having a zirconia content of 50 wt % or more, for example. Also, similarly to the first porous layer 7a and the second porous layer 7b described above, the first porous layer 7a and the second porous layer 7b illustrated in FIG. 8 may each be configured as an insulating layer, for example.

Similarly to the first porous layer 7a and the second porous layer 7b described above with reference to FIGS. 1, 2, 4, and 5, the first porous layer 7a and the second porous layer 7b illustrated in FIG. 8 each include an exposed portion 71 and an unexposed portion 72.

In the first porous layer 7a illustrated in FIG. 8, the exposed portion 71 extends into the second internal cavity 40 from a position at which the lower end of the right side face 59r of the spacer layer 5 is in contact with the face of the first porous layer 7a that faces the second internal cavity 40, and faces the upper face of the first solid electrolyte layer 4. In the second porous layer 7b illustrated in FIG. 8, the exposed portion 71 extends into the second internal cavity 40 from a position at which the upper end of the right side face 59r of the spacer layer 5 is in contact with the face of the second porous layer 7b that faces the second internal cavity 40, and faces the lower face of the second solid electrolyte layer 6.

In FIG. 8, the sum of the volume of the exposed portion 71 of the first porous layer 7a and the volume of the exposed portion 71 of the second porous layer 7b is 5% or more and 30% or less of the volume of the second internal cavity 40, for example.

In the first porous layer 7a illustrated in FIG. 8, the unexposed portion 72 is a portion of the first porous layer 7a that is located between the spacer layer 5 and the first solid electrolyte layer 4, and does not face the second internal cavity 40 (target gas flow portion 8). The unexposed portion 72 of the first porous layer 7a illustrated in FIG. 8 extends into the spacer layer 5 from a position at which the lower end of the right side face 59r of the spacer layer 5 is in contact with the face of the first porous layer 7a that faces the second internal cavity 40, and faces the upper face of the first solid electrolyte layer 4. In the first porous layer 7a illustrated in FIG. 8, the volume of the unexposed portion 72 is 10% or more of the volume of the first porous layer 7a illustrated in FIG. 8, for example.

In the second porous layer 7b illustrated in FIG. 8, the unexposed portion 72 is a portion of the second porous layer 7b that is located between the spacer layer 5 and the second solid electrolyte layer 6, and does not face the second internal cavity 40 (target gas flow portion 8). The unexposed portion 72 of the second porous layer 7b illustrated in FIG. 8 extends into the spacer layer 5 from a position at which the upper end of the right side face 59r of the spacer layer 5 is in contact with the face of the second porous layer 7b that faces the second internal cavity 40, and faces the lower face of the second solid electrolyte layer 6. Also, in the second porous layer 7b illustrated in FIG. 8, the volume of the unexposed portion 72 is 10% or more of the volume of the second porous layer 7b illustrated in FIG. 8, for example.

In the gas sensor element 100 illustrated in FIG. 8, the first porous layer 7a (porous layer 7) overlaps a portion of an opposing face of the bottom electrode portion 51b disposed inside the target gas flow portion 8 (second internal cavity 40), the opposing face being on the side opposite to the face that is in contact with (faces) the first solid electrolyte layer 4. In particular, in the gas sensor element 100 illustrated in FIG. 8, the area of the portion of the bottom electrode portion 51b overlapped by the first porous layer 7a is 0.5% or more and 20% or less of the area of the opposing face of the bottom electrode portion 51b on the side opposite to the face that is in contact with the first solid electrolyte layer 4.

Also, in the gas sensor element 100 illustrated in FIG. 8, the second porous layer 7b (porous layer 7) overlaps a portion of an opposing face of the ceiling electrode portion 51a disposed inside the target gas flow portion 8 (second internal cavity 40), the opposing face being on the side opposite to the face that is in contact with (faces) the second solid electrolyte layer 6. In particular, in the gas sensor element 100 illustrated in FIG. 8, the area of the portion of the ceiling electrode portion 51a overlapped by the second porous layer 7b is 0.5% or more and 20% or less of the area of the opposing face of the ceiling electrode portion 51a on the side opposite to the face that is in contact with the second solid electrolyte layer 6.

FIG. 8 shows an example in which a porous layer 7 (first porous layer 7a, second porous layer 7b) faces the second internal cavity 40 (target gas flow portion 8) and is in contact with the right side face 59r of the spacer layer 5. However, the porous layer 7 that faces the second internal cavity 40 may be in contact with the left side face 59l of the spacer layer 5 that defines the second internal cavity 40 (target gas flow portion 8). Also, if the gas introduction opening 10 is not arranged at the front side face of the gas sensor element 100, the porous layer 7 that faces the target gas flow portion 8 may be in contact with the rear side face 59b of the spacer layer 5 that partitions the front side of the target gas flow portion 8.

As illustrated in FIGS. 4 and 6 to 8, in the gas sensor element 100, at least one of the porous layers 7 (first porous layer 7a, second porous layer 7b) overlaps a portion of at least one electrode disposed inside the target gas flow portion 8. Specifically, the porous layer 7 overlaps at least a portion of an opposing face of the electrode on the side opposite to the face that is in contact with at least either the first solid electrolyte layer 4 or the second solid electrolyte layer 6. FIGS. 4 and 6 show an example in which the first porous layer 7a (porous layer 7) overlaps a portion of the upper face of the measurement electrode 44. Also, FIG. 7 shows an example in which the first porous layer 7a overlaps a portion of the upper face of the bottom electrode portion 22b, and the second porous layer 7b overlaps a portion of the lower face of the ceiling electrode portion 22a. Also, FIG. 8 shows an example in which the first porous layer 7a overlaps a portion of the upper face of the bottom electrode portion 51b, and the second porous layer 7b overlaps a portion of the lower face of the ceiling electrode portion 51a. The measurement electrode 44, the ceiling electrode portion 22a, the bottom electrode portion 22b, the ceiling electrode portion 51a, and the bottom electrode portion 51b are examples of electrodes disposed inside the target gas flow portion 8 (internal space).

In the gas sensor element 100, the area of the portion of the electrode overlapped by the porous layer 7 is 0.5% or more and 20% or less of the area of the opposing face of the electrode, for example.

The following describes matter to be noted regarding the gas sensor element 100 described above.

(I) Chamber that Porous Layer Faces

In the gas sensor element 100, the porous layer 7 faces the target gas flow portion 8. The target gas flow portion 8 includes one or more chambers into or from which oxygen is pumped, and the porous layer 7 included in the gas sensor element 100 faces at least one chamber. For example, among the chambers included in the target gas flow portion 8, the porous layer 7 may face the third internal cavity 17 as illustrated in FIGS. 1 to 6, may face the first internal cavity 20 as illustrated in FIG. 7, or may face the second internal cavity 40 as illustrated in FIG. 8.

The gas sensor element 100 may include one or more porous layers 7, and the porous layer 7 may face one chamber or a plurality of chambers. For example, any of the one or more porous layers 7 included in the gas sensor element 100 may face only the first internal cavity 20, may face only the second internal cavity 40, or may face only the third internal cavity 17.

Similarly, the gas sensor element 100 may include one or more porous layers 7 that face the first internal cavity 20 and one or more porous layers 7 that face the second internal cavity 40. Also, the gas sensor element 100 may include one or more porous layers 7 that face the first internal cavity 20 and one or more porous layers 7 that face the third internal cavity 17. Furthermore, the gas sensor element 100 may include one or more porous layers 7 that face the second internal cavity 40 and one or more porous layers 7 that face the third internal cavity 17. The gas sensor element 100 may include one or more porous layers 7 that face the first internal cavity 20, one or more porous layers 7 that face the second internal cavity 40, and one or more porous layers 7 that face the third internal cavity 17.

For example, the gas sensor element 100 desirably includes at least one porous layer out of a first porous layer 7a that faces the first internal cavity 20, a first porous layer 7a that faces the second internal cavity 40, a first porous layer 7a that faces the third internal cavity 17, a second porous layer 7b that faces the first internal cavity 20, a second porous layer 7b that faces the second internal cavity 40, and a second porous layer 7b that faces the third internal cavity 17.

Note that among the porous layers 7, the first porous layer 7a is a porous layer 7 that is in contact with both the first solid electrolyte layer 4 and one of the side faces 59 of the spacer layer 5, and the second porous layer 7b is a porous layer 7 that is in contact with both the second solid electrolyte layer 6 and one of the side faces 59 of the spacer layer 5.

Note that it is not essential that the target gas flow portion 8 includes the first internal cavity 20, the second internal cavity 40, and the third internal cavity 17 as chambers into or from which oxygen is pumped. It is not essential that the target gas flow portion 8 is partitioned into two or more chambers by one or more diffusion control portions that apply predetermined diffusion resistance to a measurement target gas (at least one portion out of the first diffusion control portion 11, the second diffusion control portion 13, the third diffusion control portion 30, and the fourth diffusion control portion 16). The target gas flow portion 8 may include one chamber or a plurality of chambers, and the case where the target gas flow portion 8 is portioned into the first internal cavity 20, the second internal cavity 40, and the third internal cavity 17 is merely one example of the gas sensor element 100. The gas sensor element 100 desirably includes a porous layer 7 that faces at least one of one or more chambers of the target gas flow portion 8 and that is in contact with a side face 59 of the spacer layer 5 that faces the chamber and with at least either the first solid electrolyte layer 4 or the second solid electrolyte layer 6.

(II) Side Face of Spacer Layer in Contact with Porous Layer

In the gas sensor element 100, the porous layer 7 that faces the target gas flow portion 8 is in contact with at least one of the side faces 59 of the spacer layer 5 that face the target gas flow portion 8. For example, among the side faces 59 of the spacer layer 5 that face the target gas flow portion 8, the porous layer 7 may be in contact with the front side face 59f as illustrated in FIGS. 1 to 6, or may be in contact with the right side face 59r as illustrated in FIGS. 7 and 8. Also, although not illustrated, out of the side faces 59 of the spacer layer 5 that face the target gas flow portion 8, the porous layer 7 may be in contact with the left side face 59l or may be in contact with the rear side face 59b.

In the gas sensor element 100 illustrated in FIG. 1, the gas introduction opening 10 is arranged in the front side face of the gas sensor element 100. However, in the gas sensor element 100, whether or not the gas introduction opening 10 is provided is optional, and if provided, it may be provided in any side face of the gas sensor element 100; for example, the gas introduction opening 10 may be arranged in the right side face of the gas sensor element 100. For example, if the gas introduction opening 10 is not provided, or if the gas introduction opening 10 is arranged in the right side face of the gas sensor element 100, the porous layer 7 that faces the target gas flow portion 8 may be in contact with the rear side face 59b of the spacer layer 5 that faces the target gas flow portion 8. Whether or not the gas introduction opening 10 is provided and which side face of the gas sensor element 100 it is provided in will be described in detail later.

The gas sensor element 100 may include one or more porous layers 7, and the one or more porous layers 7 may be in contact with one side face 59 or a plurality of side faces 59 of the spacer layer 5. For example, any of the one or more porous layers 7 included in the gas sensor element 100 may be in contact with only the front side face 59f of the spacer layer 5, may be in contact with only the rear side face 59b, may be in contact with only the right side face 59r, or may be in contact with only the left side face 59l.

Similarly, out of the front side face 59f, the rear side face 59b, the right side face 59r, and the left side face 59l of the spacer layer 5, two or more side faces 59 may be in contact with the porous layer 7. For example, the gas sensor element 100 may include one or more porous layers 7 that are in contact with the front side face 59f of the spacer layer 5 and one or more porous layers 7 that are in contact with the rear side face 59b of the spacer layer 5. The gas sensor element 100 may include one or more porous layers 7 that are in contact with the front side face 59f of the spacer layer 5 and one or more porous layers 7 that are in contact with the right side face 59r of the spacer layer 5. The gas sensor element 100 may include one or more porous layers 7 that are in contact with the front side face 59f of the spacer layer 5 and one or more porous layers 7 that are in contact with the left side face 59l of the spacer layer 5. The gas sensor element 100 may include one or more porous layers 7 that are in contact with the rear side face 59b of the spacer layer 5 and one or more porous layers 7 that are in contact with the right side face 59r of the spacer layer 5. The gas sensor element 100 may include one or more porous layers 7 that are in contact with the rear side face 59*b* of the spacer layer 5 and one or more porous layers 7 that are in contact with the left side face 591 of the spacer layer 5. The gas sensor element 100 may include one or more porous layers 7 that are in contact with the right side face 59*r* of the spacer layer 5 and one or more porous layers 7 that are in contact with the left side face 591 of the spacer layer 5.

The gas sensor element 100 may include one or more porous layers 7 that are in contact with the front side face 59*f*, the rear side face 59*b*, and the right side face 59*r* of the spacer layer 5. The gas sensor element 100 may include one or more porous layers 7 that are in contact with the front side face 59*f*, the rear side face 59*b*, and the left side face 591 of the spacer layer 5. The gas sensor element 100 may include one or more porous layers 7 that are in contact with the front side face 59*f*, the right side face 59*r*, and the left side face 591 of the spacer layer 5. The gas sensor element 100 may include one or more porous layers 7 that are in contact with the rear side face 59*b*, the right side face 59*r*, and the left side face 591 of the spacer layer 5.

The gas sensor element 100 may include one or more porous layers 7 that are in contact with the front side face 59*f*, the rear side face 59*b*, the right side face 59*r*, and the left side face 591 of the spacer layer 5.

(III) Solid Electrolyte Layer in Contact with Porous Layer

The gas sensor element 100 desirably includes at least either the first porous layer 7*a* that is in contact with the first solid electrolyte layer 4 or the second porous layer 7*b* that is in contact with the second solid electrolyte layer 6, as the porous layer 7 arranged so as to face the target gas flow portion 8. In other words, the gas sensor element 100 desirably includes a porous layer 7 that is arranged so as to face the target gas flow portion 8 and is in contact with at least either the first solid electrolyte layer 4 or the second solid electrolyte layer 6.

For example, the gas sensor element 100 may include a first porous layer 7*a* such as that illustrated in FIGS. 1 to 4, may include a second porous layer 7*b* such as that illustrated in FIG. 5, or may include a first porous layer 7*a* and a second porous layer 7*b* such as those illustrated in FIGS. 7 and 8. Also, the porous layer 7 included in the gas sensor element 100 is not limited to being in contact with only either the first solid electrolyte layer 4 or the second solid electrolyte layer 6, and may be in contact with both the first solid electrolyte layer 4 and the second solid electrolyte layer 6 as illustrated in FIG. 6.

(IV) Number of Porous Layers

The gas sensor element 100 may include at least either the first porous layer 7*a* or the second porous layer 7*b*, may include only the first porous layer 7*a*, may include only the second porous layer 7*b*, or may include both the first porous layer 7*a* and the second porous layer 7*b*.

FIGS. 1 to 6 illustrate examples of gas sensor elements 100 that include one porous layer 7 that faces one chamber and is in contact with one of the side faces 59 of the spacer layer 5. Also, FIGS. 7 to 8 show examples of gas sensor elements 100 that include two porous layers 7 that face one chamber and are in contact with one of the side faces 59 of the spacer layer 5. However, the gas sensor element 100 may include a plurality of porous layers 7 that face one chamber, and a configuration is possible in which one of the porous layers 7 is in contact with the right side face 59*r* of the spacer layer 5 and another one of the porous layers 7 is in contact with the left side face 591 of the spacer layer 5. Also, if the target gas flow portion 8 is partitioned into two or more chambers, the gas sensor element 100 may include a plurality of porous layers 7 that respectively face the chambers. For example, the gas sensor element 100 may include a porous layer 7 that faces the first internal cavity 20, a porous layer 7 that faces the second internal cavity 40, and a porous layer 7 that faces the third internal cavity 17. The gas sensor element 100 desirably includes a porous layer 7 that faces the target gas flow portion 8 (one chamber included in the target gas flow portion 8) and is in contact with a side face 59 of the spacer layer 5 and at least either the first solid electrolyte layer 4 or the second solid electrolyte layer 6.

(V) Extension into Target Gas Flow Portion

The gas sensor element 100 desirably includes a porous layer 7 that is arranged so as to face the target gas flow portion 8, and is in contact with a side face 59 of the spacer layer 5 that faces the target gas flow portion 8 and at least either the first solid electrolyte layer 4 or the second solid electrolyte layer 6. It is not essential that the porous layer 7 included in the gas sensor element 100 extends into the target gas flow portion 8, and the porous layer 7 may extend into the target gas flow portion 8 or may not extend into the target gas flow portion 8. In other words, the porous layer 7 may extend into the target gas flow portion 8, that is to say may include the exposed portion 71, as illustrated in FIGS. 1, 2, 4 to 8. Also, the porous layer 7 does not need to extend into the target gas flow portion 8, that is to say does not need to include the exposed portion 71, as illustrated in FIG. 3.

As described above, the exposed portion 71 is a portion that extends into the target gas flow portion 8 from a position at which an end portion (lower end, upper end) of the side face 59 of the spacer layer 5 that faces the target gas flow portion 8 is in contact with the face of the porous layer 7 that faces the target gas flow portion 8.

In the gas sensor element 100, if one or more porous layers 7 extend into one chamber of the target gas flow portion 8, it is desirable that the sum of the volumes of the exposed portions 71 of the one or more porous layers 7 is 5% or more and 30% or less of the volume of the chamber. For example, if only one porous layer 7 extends into one chamber as illustrated in FIGS. 1, 2, 4, and 5, it is desirable that the volume of the exposed portion 71 of the one porous layer 7 is 5% or more and 30% or less of the volume of the one chamber. Also, if a plurality of porous layers 7 extend into one chamber as illustrated in FIGS. 7 and 8, it is desirable that the sum of the volumes of the exposed portions 71 of the porous layers 7 is 5% or more and 30% or less of the volume of the one chamber.

Note that in the case where a plurality of porous layers 7 extend into one chamber, the plurality of porous layers 7 may each be in contact with the same side face 59 of the spacer layer 5, or may be in contact with different side faces 59 of the spacer layer 5. For example, two porous layers 7 that face the third internal cavity 17 may both be in contact with the right side face 59*r* of the spacer layer 5, and in this case, the sum of the volumes of the exposed portions 71 of the two porous layers 7 is desirably 5% or more and 30% or less of the volume of the third internal cavity 17. As another example, a configuration is possible in which one porous layer 7 that faces the third internal cavity 17 is in contact with the right side face 59*r* of the spacer layer 5, and another porous layer 7 that faces the third internal cavity 17 is in contact with the left side face 591 of the spacer layer 5. In this case, it is desirable that the sum of the volume of the exposed portion 71 of the one porous layer 7 and the volume of the exposed portion 71 of the other porous layer 7 is 5% or more and 30% or less of the volume of the third internal cavity 17.

(VI) Extension into Spacer Layer

In the gas sensor elements 100 described above, the porous layer 7 includes the unexposed portion 72. In other words, the porous layers 7 described above each include the unexposed portion 72, which is a portion that is sandwiched between the spacer layer 5 and the first solid electrolyte layer 4 or the second solid electrolyte layer 6 and that does not face the target gas flow portion 8. The gas sensor elements 100 illustrated in FIGS. 1 to 8 each include at least either the first porous layer 7a that is arranged between, and in contact with, the first solid electrolyte layer 4 and the spacer layer 5, or the second porous layer 7b that is arranged between, and in contact with, the second solid electrolyte layer 6 and the spacer layer 5. For example, in the gas sensor element 100 illustrated in FIG. 2, the first porous layer 7a is arranged between, and in contact with, the first solid electrolyte layer 4 (particularly the upper face thereof) and a side face 59 (particularly the lower end thereof) of the spacer layer 5 that faces the target gas flow portion 8, such that they do not come into contact with each other. As another example, in the gas sensor element 100 illustrated in FIG. 5, the second porous layer 7b is arranged between, and in contact with, the second solid electrolyte layer 6 (particularly the lower face thereof) and a side face 59 (particularly the upper end thereof) of the spacer layer 5 that faces the target gas flow portion 8, such that they do not come into contact with each other.

However, in the gas sensor element 100, it is desirable that the porous layer 7 is arranged so as to face the target gas flow portion 8 and be in contact with a side face 59 of the spacer layer 5 that faces the target gas flow portion 8 and at least either the first solid electrolyte layer 4 or the second solid electrolyte layer 6. In other words, it is not essential that the porous layer 7 includes the unexposed portion 72 in the gas sensor element 100, and the porous layer 7 may include the unexposed portion 72 or may not include the unexposed portion 72.

For example, the porous layer 7 may be arranged at a position corresponding to a corner portion of a conventional target gas flow portion so as to face the target gas flow portion 8. Specifically, the first porous layer 7a may be arranged inside the target gas flow portion 8 so as to be in contact with a contact position between the first solid electrolyte layer 4 (particularly the upper face thereof) and a side face 59 (particularly the lower end thereof) of the spacer layer 5 that faces the target gas flow portion 8. Similarly, the second porous layer 7b may be arranged inside the target gas flow portion 8 so as to be in contact with a contact position between the second solid electrolyte layer 6 (particularly the lower face thereof) and a side face 59 (particularly the upper end thereof) of the spacer layer 5 that faces the target gas flow portion 8.

In other words, a configuration is possible in which, in the gas sensor element 100, a side face 59 of the spacer layer 5 that faces the target gas flow portion 8 is not in contact with the upper face of the first solid electrolyte layer 4 (or the lower face of the second solid electrolyte layer 6). In the case where a side face 59 of the spacer layer 5 that faces the target gas flow portion 8 is in contact with the upper face of the first solid electrolyte layer 4 (or the lower face of the second solid electrolyte layer 6), it is desirable that the gas sensor element 100 includes a porous layer 7 that is in contact with the contact position between such members and faces the target gas flow portion 8.

Due to arranging the porous layer 7 so as to face the target gas flow portion 8 at a position corresponding to a corner portion of a conventional target gas flow portion, stress that becomes concentrated at the corner portion can be reduced, and it is possible to suppress the formation of a crack in or near a corner portion. Accordingly, the gas sensor element 100 can avoid a situation where "stress becomes concentrated in a corner portion of the target gas flow portion 8 and a crack is formed in or near a corner portion", and the gas sensor element 100 can be used for a relatively long period of time without leading to a problem even in a harsh usage environment.

Note that as described above, it may also be said that the unexposed portion 72 is a portion that extends into the spacer layer 5 from a location where an end portion (lower end, upper end) of a side face 59 of the spacer layer 5 that faces the target gas flow portion 8 is in contact with the face of the porous layer 7 that faces the target gas flow portion 8

(VII) Overlap with Electrode

In the gas sensor element 100, the porous layer 7 may or may not overlap a portion of a surface of an electrode disposed inside the target gas flow portion 8, specifically a surface that faces the target gas flow portion 8.

For example, a configuration is possible in which, as illustrated in FIGS. 1 to 3 and 5, the first porous layer 7a does not overlap a portion of a surface of an electrode (measurement electrode 44 in the figure) disposed inside the target gas flow portion 8, specifically a surface that faces the target gas flow portion 8. Also, as illustrated in FIGS. 4 and 6 to 8, the first porous layer 7a (porous layer 7) may overlap a portion of a surface of an electrode (measurement electrode 44, bottom electrode portion 22b, or bottom electrode portion 51b in the figure) disposed inside the target gas flow portion 8, specifically a surface that faces the target gas flow portion 8. Also, as illustrated in FIGS. 6 to 8, the second porous layer 7b (porous layer 7) may overlap a portion of a surface of an electrode (measurement electrode 44, ceiling electrode portion 22a, or ceiling electrode portion 51a in the figure) disposed inside the target gas flow portion 8, specifically a surface that faces the target gas flow portion 8.

In the gas sensor elements 100 illustrated in FIGS. 4 and 6 to 8, the area of the portion of the electrode disposed inside the target gas flow portion 8 overlapped by the porous layer 7 is 0.5% or more and 20% or less of the area of the area of the surface of the electrode that faces the target gas flow portion 8, for example.

(VIII) Configuration of Gas Sensor Element

Constituent elements of the gas sensor element 100 in the above embodiments may be omitted, replaced, or added as appropriate. In the case where the gas sensor element 100 is constituted by stacking solid electrolyte layers, as long as the gas sensor element 100 includes a plurality of solid electrolyte layers, the number of solid electrolyte layers that are stacked may be changed as appropriate.

Also, in the gas sensor element 100, it is not essential that the target gas flow portion 8 is partitioned into two or more chambers by one or more diffusion control portions that apply predetermined diffusion resistance to a measurement target gas. In the examples described above, the target gas flow portion 8 is partitioned into the first internal cavity 20, the second internal cavity 40, and the third internal cavity 17 by the first diffusion control portion 11, the second diffusion control portion 13, the third diffusion control portion 30, and the fourth diffusion control portion 16. However, the target gas flow portion 8 need only include one or more chambers into or from which oxygen is pumped, and it is not essential that the target gas flow portion 8 includes a plurality of chambers. For example, the target gas flow portion 8 may include two chambers into or from which oxygen is pumped, or may contain only one. Also, it is not essential that the gas sensor element 100 includes one or more diffusion control portions.

(IX) Arrangement of Gas Introduction Opening and Gas Discharge Portion

In the above embodiment, an example has been described in which the gas introduction opening 10 is provided in the front side face of the gas sensor element 100, but it is not essential in the gas sensor element 100 that the gas introduction opening 10 is provided in the front side face of the gas sensor element 100. The gas sensor element 100 need only be able to introduce a measurement target gas from the external space into the target gas flow portion 8, and the gas introduction opening 10 may be arranged in the right side face or the left side face of the gas sensor element 100, for example.

Also, it is not essential that the gas sensor element 100 includes the gas introduction opening 10. In other words, in the gas sensor element 100, it is sufficient that a measurement target gas in the external space can be introduced into the target gas flow portion 8, and it is not essential that the measurement target gas in the external space is introduced through the gas introduction opening 10. For example, in the gas sensor element 100, if at least one of the side faces 59 of the spacer layer 5 is left open instead of being blocked by a dense ceramic layer, a measurement target gas in the external space may be introduced into the target gas flow portion 8 without provision of the gas introduction opening 10.

Working Example a (Temperature Rise Test)

In order to verify an effect of the present invention (particularly, a crack suppressing effect, which is an effect of suppressing the formation of cracks), gas sensors according to the following working examples and comparative examples were manufactured. However, the present invention is not limited to the following working examples.

Gas sensor elements according to Working Examples 1 to 11, Comparative Example 2, and Comparative Example 3 were manufactured using the configuration shown in FIGS. 1 and 2. Also, Comparative Example 1 is a conventional gas sensor element that does not include a porous layer 7, that is to say a gas sensor element in which the rear side of the target gas flow portion 8 (e.g., the third internal cavity 17) is blocked by the front side face 59f of the spacer layer 5, and a porous layer 7 that faces the target gas flow portion 8 is not provided. Comparative Example 1 has the same structure as the gas sensor elements 100 described above (e.g., the gas sensor element 100 of FIG. 1), except that the porous layer 7 is not provided. In other words, the difference between Comparative Example 1 and Examples 1 to 11 and Comparative Examples 2 and 3 is whether or not the porous layer 7 is provided.

Note that as described above, the porous layer 7 is a porous layer, and "porous" means that the porosity is 10% or more. For this reason, the porosity of the porous layer 7 included in the gas sensor elements according to Working Examples 1 to 11, Comparative Example 2, and Comparative Example 3 is 10% or more. Also, the porosity of the porous layer 7 included in the gas sensor elements according to Working Examples 1 to 11, Comparative Example 2, and Comparative Example 3 is a value measured by analyzing an SEM image obtained by observing the porous layer 7 with a scanning electron microscope (SEM).

Among the gas sensor elements according to Working Examples 1 to 11, Comparative Example 2, and Comparative Example 3, which have the configuration shown in FIGS. 1 and 2, the porosity of the porous layer 7 (first porous layer 7a) included in the gas sensor element was set to 50% or less in Working Examples 1 to 11. On the other hand, in Comparative Example 2 and Comparative Example 3, the porosity of the porous layer 7 included in the gas sensor element was set to a value larger than 50%.

Specifically, the porosity of the porous layer 7 is 10% in Working Examples 1 and 2, 15% in Working Example 3, 20% in Working Example 4, and 25% in Working Example 5, and 30% in Working Example 6. Also, the porosity is 40% in Working Example 7, 45% in Working Example 8, 50% in Working Examples 9 and 10, and 25% in Working Example 11. On the other hand, the porosity of the porous layer 7 is 55% in Comparative Example 2, and the porosity of the porous layer 7 is 60% in Comparative Example 3.

Also, among the gas sensor elements according to Working Examples 1 to 11, Comparative Example 2, and Comparative Example 3, which have the configuration shown in FIGS. 1 and 2, Working Example 11 is different from Working Examples 1 to 10 and Comparative Examples 2 and 3 with respect to the following points. Specifically, Working Example 11 is different from Working Examples 1 to 10 and Comparative Examples 2 and 3 with respect to the ratio of the volume of the exposed portion 71 of the porous layer 7 to the volume of the chamber (third internal cavity 17) into which the porous layer 7 (first porous layer 7a) extends. Hereinafter, the ratio of the volume of the exposed portion 71 of the porous layer 7 to the volume of the chamber (third internal cavity 17) into which the porous layer 7 (first porous layer 7a) extends will sometimes simply be called the "volume ratio of the exposed portion 71".

The volume ratio of the exposed portion 71 is 5% or more in Working Examples 1 to 10 and Comparative Examples 2 to 3, but is less than 5% in Working Example 11.

Specifically, the volume ratio of the exposed portion 71 is 5.3% in Working Example 1, 20% in Working Example 2, 5% in Working Examples 3 and 5, 16% in Working Example 4, and 7% in Working Example 6. The volume ratio of the exposed portion 71 is 25% in Working Example 7, 30% in Working Example 8, 12% in Working Example 9, and 24% in Working Example 10. Further, the volume ratio of the exposed portion 71 is 18% in Comparative Example 2 and 20% in Comparative Example 3. In contrast, in Working Example 11, the volume ratio of the exposed portion 71 is 3%.

In order to adjust the volume ratio of the exposed portion 71 in Working Examples 1 to 11, Comparative Example 2, and Comparative Example 3, the thickness of the porous layer 7 (first porous layer 7a), particularly the thickness of the exposed portion 71 was set to 10 to 40 μm in Working Examples 1 to 11, Comparative Example 2, and Comparative Example 3. In other words, by setting the thickness of the exposed portion 71 to 10 to 40 μm in Working Examples 1 to 11, Comparative Example 2, and Comparative Example 3, it was possible to adjust the volume ratio of the exposed portion 71 in Working Examples 1 to 11, Comparative Example 2, and Comparative Example 3.

Note that in the gas sensor elements according to Working Examples 1 to 11, Comparative Example 2, and Comparative Example 3, the volume ratio of the exposed portion 71 was set to 30% or less for the following reasons. Specifically, if the volume ratio of the exposed portion 71 is set larger than 30%, a long amount of time is required for oxygen to be pumped out (discharged) from the chamber (third internal cavity 17) into which the porous layer 7 (first porous layer 7a) extends, and for oxygen to be pumped into the chamber. In other words, if the volume ratio of the exposed portion 71 is set larger than 30%, the light-off time (the time from when the supply of power to the heat generation unit 702 starts to when the $NO_x$ concentration can be correctly detected) becomes long. For this reason, in order to set the light-off time to a time within a range that can withstand the actual use (normal use) of the gas sensor element, the volume ratio of the exposed portion 71 is set to 30% or less.

The gas sensor elements according to the above-described Working Examples and Comparative Examples were subjected to the following temperature rise test to evaluate the formation of cracks (crack suppression). Specifically, in the temperature rise test, a larger current than during actual use (normal use) of the gas sensor element was temporarily applied to the heat generation unit 702 to apply a thermal overload to the gas sensor element. Thereafter, the state of the gas sensor element was inspected, and the formation of cracks (crack suppression) was evaluated.

In the evaluation, crack suppression is determined to be good (indicated by a circle) in the case where cracks did not form even after the thermal overload was applied (i.e., the case of no cracks). Crack suppression is determined to be fair (indicated by a triangle) in the case where minute cracks were formed after applying a thermal overload (i.e., the case of minute cracks). Crack suppression is determined to be poor (indicated by an "X") in the case where cracks that cannot be called "minute" were formed after applying a thermal overload (i.e., the case of cracks). Table 1 below shows the results of evaluating the formation of cracks. In Table 1, "provision of porous layer" indicates whether or not the porous layer 7 is provided, and "porosity" indicates the porosity of the porous layer 7 in the case where the porous layer 7 is provided. Also, "crack suppression" indicates the presence or absence of a crack after the thermal overload is applied, and the scale (size) of the crack in the case where a crack forms.

TABLE 1

|  | Provision of porous layer | Porosity (%) | Ratio of volume of extension portion of porous layer to volume of chamber (%) | Crack suppression |
|---|---|---|---|---|
| Work. Ex. 1 | Yes | 10 | 5.3 | ○ |
| Work. Ex. 2 | Yes | 10 | 20 | ○ |
| Work. Ex. 3 | Yes | 15 | 5 | ○ |
| Work. Ex. 4 | Yes | 20 | 16 | ○ |
| Work. Ex. 5 | Yes | 25 | 5 | ○ |
| Work. Ex. 6 | Yes | 30 | 7 | ○ |
| Work. Ex. 7 | Yes | 40 | 25 | ○ |
| Work. Ex. 8 | Yes | 45 | 30 | ○ |
| Work. Ex. 9 | Yes | 50 | 12 | ○ |
| Work. Ex. 10 | Yes | 50 | 24 | ○ |
| Comp. Ex. 1 | No | — | — | X |
| Comp. Ex. 2 | Yes | 55 | 18 | X |
| Comp. Ex. 3 | Yes | 60 | 20 | X |
| Work. Ex. 11 | Yes | 25 | 3 | Δ |

As shown in the evaluation results in Table 1, crack suppression was more favorable in the working examples than in the comparative examples. From these results, it was understood that, according to the present invention, by suppressing breakdown in an internal space (specifically, the formation of cracks), it is possible to provide a gas sensor element that can be used for a relatively long period of time without leading to a problem even in a harsh usage environment.

In particular, in Table 1, crack suppression is poor (X) in Comparative Example 1, and crack suppression is poor (X) in Comparative Example 2 in which the porosity of the porous layer 7 was 55% and in Comparative Example 3 in which the porosity of the porous layer 7 was 60%. On the other hand, crack suppression is good (circle) in Working Examples 1 to 10, and crack suppression is fair (triangle) in Working Example 11. In other words, crack suppression is better in Working Examples 1 to 11, which include the porous layer 7 having a porosity of 50% or less, than in Comparative Example 1 not including a porous layer 7 and Comparative Examples 2 to 3 that include a porous layer 7 having a porosity of more than 50%.

Also, as previously described, the porosity of the porous layer 7 is 10% or more. Accordingly, it was found that the formation of cracks (breakdown in the internal space) can be suppressed if the gas sensor element includes a porous layer 7 having a porosity of 10% or more and 50% or less.

Also, among the gas sensor elements that include a porous layer 7 having a porosity of 50% or less, crack suppression is good (circle) in Working Examples 1 to 10, whereas crack suppression is fair (triangle) in Working Example 11. In other words, crack suppression is better in Working Examples 1 to 10, in which the volume ratio of the exposed portion 71 is 5% or more, than in Working Example 11 in which the volume ratio of the exposed portion 71 is less than 5%.

Also, as previously described, in consideration of the light-off time, it is desirable that the volume ratio of the exposed portion 71 is 30% or less. Accordingly, it was found that, in a gas sensor element that includes a porous layer 7 having a porosity of 10% or more and 50% or less, the formation of cracks (breakdown in an internal space) can be even more effectively suppressed if the volume ratio of the exposed portion 71 is set to 5% or more and 30% or less.

From these results, it was verified that according to the above-described embodiment and modified examples, it is possible to provide a gas sensor element that can be used for a relatively long period of time without leading to a problem even in a harsh usage environment.

Note that in the case where the gas sensor element 100 includes one or more porous layers 7 that face a chamber, the sum of the volumes of the exposed portions 71 of the one or more porous layers 7 is preferably 5% or more and 30% or less of the volume of the chamber.

For example, in the case where the gas sensor element 100 includes a first porous layer 7a(r) that is in contact with the right side face 59r of the spacer layer 5 that faces the third internal cavity 17, and a first porous layer 7a(l) that is in contact with the left side face 59l of the spacer layer 5 that faces the third internal cavity 17, the volume relationship is as follows. The sum of the volume of an exposed portion 71a(r) of the first porous layer 7a(r) and the volume of an exposed portion 71a(l) of the first porous layer 7a(l) is 5% or more and 30% or less of the volume of the third internal cavity 17.

Working Example B (Electrode Peeling Test)

In order to verify an effect of the present invention (particularly, an electrode peeling suppression effect, which is an effect of suppressing electrode peeling), gas sensors according to the following working examples were manufactured. However, the present invention is not limited to the following working examples.

Gas sensor elements according to Working Examples 1 to 5 were manufactured using the gas sensor elements in which cracks did not form in the above-mentioned temperature rise test. Specifically, the gas sensor elements according to Working Examples 1 to 5 were created using gas sensor elements that have the configuration shown in FIGS. 1 and 2, include a porous layer 7 having a porosity of 25%, and include an exposed portion 71 having a volume ratio of 15%. Specifically, in the gas sensor elements according to Working Examples 1 to 5, the thickness of the porous layer 7 (first porous layer 7a), particularly the thickness of the exposed portion 71, was fixed at 20 μm, and thus the volume ratio of the exposed portion 71 of the gas sensor elements according to Working Examples 1 to 5 was set to 15%. As previously described, the volume ratio of the exposed portion 71 means the ratio of the volume of the exposed portion 71 of the porous layer 7 to the volume of the chamber (third internal cavity 17) into which the porous layer 7 (first porous layer 7a) extends.

In particular, in the gas sensor elements according to Working Examples 1 to 5, as illustrated in FIG. 4, the porous layer 7 (first porous layer 7a) overlaps a portion of a surface of an electrode (measurement electrode 44) disposed in a chamber (third internal cavity 17), specifically a surface of the electrode that faces the chamber. The gas sensor elements according to Working Examples 1 to 5 are different from each other in terms of the ratio of the area of the overlapped portion (overlapped by the porous layer 7) of the face of the electrode (measurement electrode 44) that faces the chamber (third internal cavity 17) to the total area of the face of the electrode that faces the chamber. In the following, the "ratio of the area of the overlapped portion (overlapped by the porous layer 7) of the face of the electrode that faces the chamber to the total area of the face of the electrode that faces the chamber" will sometimes simply be called the "area ratio".

Specifically, the area ratio is 0.25% in Working Example 1, 5% in Working Example 2, 10% in Working Example 3, 15% in Working Example 4, and 20% in Working Example 5.

Note that in the gas sensor elements according to Working Examples 1 to 5, the area ratio was set to 20% or less for the following reasons. Specifically, if the area ratio is larger than 20%, the electrode performance (e.g., detection accuracy) may deteriorate. For this reason, in the gas sensor elements according to Working Examples 1 to 5, the area ratio was set to 20% or less.

The gas sensor elements according to the above-described working examples were subjected to an electrode peeling test using the following evaluation system ES, and the electrode peeling suppression effect was evaluated. Specifically, the evaluation system ES included an air blower BL, a gas flow path FP connected to the air blower BL, and the gas sensor elements according to the working examples, which were fixed in the gas flow path FP.

In the electrode peeling test, first, the evaluation system ES is placed in an air atmosphere at room temperature. Then, the flow velocity of the gas flow (air flow) created by the air blower BL is set to 0 m/sec. Under these conditions, the voltage between the electrodes of the measurement pump cell 41 is measured (hereinafter referred to as the first voltage). Next, one cycle of normal control (normal use) for one minute and then control stop for one minute following normal control is repeated 80,000 times. In normal control, power is supplied to the heater 70 and signals are transferred to and received from the electrodes of the gas sensor elements according to the working examples. In control stop, both the supply of power to the heater 70 and the exchange of signals with the electrodes of the gas sensor elements according to the working examples are stopped. During the 80,000 cycles, the flow velocity of the air flow created by the air blower BL is maintained at 0 m/sec. Next, the voltage between the electrodes of the measurement pump cell 41 is measured under the same conditions as the first voltage (hereinafter referred to as a second voltage). After measuring the second voltage, the gas sensor elements according to the working examples are cut off. Then, the interface between an electrode (measurement electrode 44) and a solid electrolyte layer (first solid electrolyte layer 4) in a cross section was observed using an SEM.

After 80,000 cycles, the interface between the measurement electrode 44 and the first solid electrolyte layer 4 was observed, and "electrode peeling suppression" was evaluated to be "A" in cases in which peeling did not occur, whereas "electrode peeling suppression" was evaluated to be "B" in cases in which minor peeling occurred. Table 2 below shows the results of evaluation of electrode peeling suppression (electrode peeling suppression effect). In Table 2, "area ratio of portion of electrode overlapped by porous layer (%)" indicates the above-described "area ratio". In other words, the "area ratio of portion of electrode overlapped by porous layer (%)" is the "ratio of the area of the overlapped portion (overlapped by the porous layer 7) of the face of the electrode that faces the chamber to the total area of the face of the electrode that faces the chamber". Also, "electrode peeling suppression" indicates the presence/absence and scale (magnitude) of peeling of the electrode (measurement electrode 44) from the solid electrolyte layer (first solid electrolyte layer 4) after 80,000 cycles.

TABLE 2

| | Area ratio of portion of electrode overlapped by porous layer (%) | Electrode peeling suppression |
| --- | --- | --- |
| Work. Ex. 1 | 0.25 | B |
| Work. Ex. 2 | 5 | A |
| Work. Ex. 3 | 10 | A |
| Work. Ex. 4 | 15 | A |
| Work. Ex. 5 | 20 | A |

As shown in the evaluation results in Table 2, the electrode peeling suppression effect was favorable in each of the working examples. In other words, it was confirmed that, by arranging the porous layer 7 so as to overlap a portion of a face of an electrode disposed inside the target gas flow portion 8 (internal space), specifically a face of the electrode that faces the target gas flow portion 8, it is possible to suppress peeling of the electrode from the solid electrolyte layer. From these results, it was understood that, according to the present invention, by suppressing breakdown in the internal space (specifically, peeling of an electrode disposed inside the target gas flow portion 8 (internal space) from the solid electrolyte layer), it is possible to provide a gas sensor element that can be used for a relatively long period of time without leading to a problem even in a harsh usage environment.

In particular, in Table 2, electrode peeling suppression is "B" in Working Example 1, whereas electrode peeling suppression is "A" in Working Examples 2 to 5. In other words, the electrode peeling suppression effect was better in Working Examples 2 to 5, in which the area ratio was 5% or more, than in Working Example 1 having an area ratio of less than 5%.

As previously described, in consideration of electrode performance, it is desirable that the area ratio is 20% or less.

Accordingly, it was found that, in a gas sensor element that includes a porous layer 7 disposed so as to overlap an electrode disposed in the target gas flow portion 8, peeling of the electrode (breakdown in the internal space) could be more effectively suppressed if the area ratio is 0.5% or more and 20% or less.

LIST OF REFERENCE NUMERALS

100 Sensor element
4 First solid electrolyte layer
4 Second solid electrolyte layer
5 Spacer layer
59f Front side face (side face of spacer layer facing internal space)
59b Rear side face (side face of spacer layer facing internal space)
59l Left side face (side face of spacer layer facing internal space)
59r Right side face (side face of spacer layer facing internal space)
7 Porous layer
8 Target gas flow portion (internal space)
20 First internal cavity (chamber)
40 Second internal cavity (chamber)
17 Third internal cavity (chamber)
44 Measurement electrode (electrode)
22a Ceiling electrode portion (electrode)
22b Bottom electrode portion (electrode)
51a Ceiling electrode portion (electrode)
51b Bottom electrode portion (electrode)
71 Exposed portion (portion of porous layer extending inside chamber)
72 Unexposed portion

What is claimed is:

1. A gas sensor element comprising:
a laminate constituted by a first solid electrolyte layer, a second solid electrolyte layer, and a spacer layer, the spacer layer being arranged between the first solid electrolyte layer and the second solid electrolyte layer such that an internal space into which a measurement target gas is to be introduced is provided between the first solid electrolyte layer and the second solid electrolyte layer; and
one or more porous layers arranged so as to face the internal space,
wherein the one or more porous layers include at least either a first porous layer that is in contact with both the first solid electrolyte layer and at least one side face of the spacer layer that faces the internal space, or a second porous layer that is in contact with both the second solid electrolyte layer and at least one side face of the spacer layer that faces the internal space,
each of the one or more porous layers has a porosity of 10% or more and 50% or less,
at least one porous layer among the one or more porous layers includes an unexposed portion that does not face the internal space, the unexposed portion being located between the spacer layer and at least one solid electrolyte layer out of the first solid electrolyte layer and the second solid electrolyte layer, and being in contact with both the spacer layer and the at least one solid electrolyte layer, and
a volume of the unexposed portion is 10% or more of a volume of the at least one porous layer that includes the unexposed portion.

2. The gas sensor element according to claim 1, wherein each of the one or more porous layers has a thickness of 40 μm or less.

3. The gas sensor element according to claim 1, wherein each of the one or more porous layers has a thickness of 10 μm or more.

4. The gas sensor element according to claim 1, wherein the internal space includes one or more chambers into or from which oxygen is pumped,
one or more porous layers among the one or more porous layers include a portion that extends into at least one chamber among the one or more chambers, and
a sum of volumes of the portion of each of the one or more porous layers that extends into the at least one chamber is 5% or more and 30% or less of a volume of the at least one chamber.

5. The gas sensor element according to claim 1, wherein a content percentage of zirconia in each of the one or more porous layers is 50 wt % or more.

6. The gas sensor element according to claim 1, wherein each of the one or more porous layers is an insulating layer.

7. A gas sensor element comprising:
a laminate constituted by a first solid electrolyte layer, a second solid electrolyte layer, and a spacer layer, the spacer layer being arranged between the first solid electrolyte layer and the second solid electrolyte layer such that an internal space into which a measurement target gas is to be introduced is provided between the first solid electrolyte layer and the second solid electrolyte layer; and
one or more porous layers arranged so as to face the internal space,
wherein the one or more porous layers include at least either a first porous layer that is in contact with both the first solid electrolyte layer and at least one side face of the spacer layer that faces the internal space, or a second porous layer that is in contact with both the second solid electrolyte layer and at least one side face of the spacer layer that faces the internal space,
each of the one or more porous layers has a porosity of 10% or more and 50% or less, wherein
at least one porous layer among the one or more porous layers overlaps at least a portion of an opposing face of at least one electrode disposed inside the internal space, the opposing face being on a side opposite to a face of the at least one electrode that is in contact with at least either the first solid electrolyte layer or the second solid electrolyte layer, and
an area of the portion of the opposing face of the at least one electrode overlapped by the at least one porous layer is 0.5% or more and 20% or less of an area of the opposing face of the at least one electrode.

8. The gas sensor element according to claim 7, wherein each of the one or more porous layers has a thickness of 40 μm or less.

9. The gas sensor element according to claim 7, wherein each of the one or more porous layers has a thickness of 10 μm or more.

10. The gas sensor element according to claim 7, wherein the internal space includes one or more chambers into or from which oxygen is pumped,
one or more porous layers among the one or more porous layers include a portion that extends into at least one chamber among the one or more chambers, and a sum of volumes of the portion of each of the one or more porous layers that extends into the at least one chamber is 5% or more and 30% or less of a volume of the at least one chamber.

11. The gas sensor element according to claim 7, wherein a content percentage of zirconia in each of the one or more porous layers is 50 wt % or more.

12. The gas sensor element according to claim 7, wherein each of the one or more porous layers is an insulating layer.

* * * * *